United States Patent
Kao et al.

(10) Patent No.: US 6,620,075 B2
(45) Date of Patent: Sep. 16, 2003

(54) MULTI-SPEED TRANSMISSION MECHANISMS WITH THREE PLANETARY GEARSETS AND INPUT CLUTCHES

(75) Inventors: Chi-Kuan Kao, Troy, MI (US); Madhusudan Raghavan, West Bloomfield, MI (US); Patrick Benedict Usoro, Troy, MI (US); Chunhao J. Lee, Troy, MI (US); Norman Kenneth Bucknor, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/041,306

(22) Filed: Jan. 8, 2002

(65) Prior Publication Data

US 2003/0130084 A1 Jul. 10, 2003

(51) Int. Cl.$^7$ ................................................ F16H 3/62
(52) U.S. Cl. ..................................................... 475/275
(58) Field of Search ............................... 475/275, 276, 475/282, 286, 278

(56) References Cited

U.S. PATENT DOCUMENTS

| | | | |
|---|---|---|---|
| 4,070,927 A | 1/1978 | Polak | 74/765 |
| 5,106,352 A | 4/1992 | Lepelletier | 475/280 |
| 5,599,251 A | 2/1997 | Beim et al. | 475/275 |
| 5,879,264 A | 3/1999 | Raghavan et al. | 475/280 |
| 5,951,432 A | 9/1999 | Wehking et al. | 475/280 |
| 5,984,825 A | 11/1999 | Hebbale et al. | 475/286 |
| 5,997,429 A | 12/1999 | Raghavan et al. | 475/280 |
| 6,007,450 A | 12/1999 | Raghavan et al. | 475/286 |
| 6,056,665 A | 5/2000 | Raghavan et al. | 475/280 |
| 6,071,208 A | 6/2000 | Koivunen | 475/275 |
| 6,083,135 A | 7/2000 | Baldwin et al. | 475/276 |

FOREIGN PATENT DOCUMENTS

EP 1033510 9/2000

*Primary Examiner*—Dirk Wright
(74) *Attorney, Agent, or Firm*—Kathryn A. Marra

(57) ABSTRACT

A family of power transmissions have three planetary gearsets each of which have first, second, and third members. A pair of fixed interconnecting members establish continuous connections between a member of the first planetary gearset and a member of the second planetary gearset, and between another member of the second planetary gearset and a member of the third planetary gearset, respectively. Each of the transmission family members has an output shaft, which is continuously connected with at least one member of one of the planetary gearsets and an input shaft, which is selectively connectible with at least two members of the planetary gearsets through respective first and second torque-transmitting mechanisms. Four other torque-transmitting mechanisms are provided to establish various interconnections between members of the planetary gearsets and/or members of the planetary gearsets and the transmission housing. The six torque-transmitting mechanisms are selectively engageable in combinations of four to establish at least seven forward speed ratios and one reverse speed ratio between the input shaft and the output shaft through the planetary transmission.

5 Claims, 17 Drawing Sheets

| | Ratios | 50 | 52 | 54 | 56 | 58 | 60 |
|---|---|---|---|---|---|---|---|
| Reverse | -2.95 | X | | X | X | | X |
| Neutral | 0.00 | X | | | X | | X |
| 1 | 4.49 | X | | | X | X | X |
| 2 | 2.70 | X | | X | X | X | |
| 3 | 1.99 | X | X | | X | X | |
| 4 | 1.43 | | X | X | X | X | |
| 5 | 1.00 | X | X | X | | X | |
| 6 | 0.75 | | X | X | | X | X |
| 7 | 0.64 | X | X | | | X | X |

(X = engaged)

Ring/Sun Tooth Ratios: $\frac{R1}{S1} = 2.24, \frac{R2}{S2} = 2.13, \frac{R3}{S3} = 2.95$

| Ratio Spread | 7.01 |
|---|---|
| Ratio Steps | |
| Rev/1 | -0.66 |
| 1/2 | 1.66 |
| 2/3 | 1.35 |
| 3/4 | 1.39 |
| 4/5 | 1.43 |
| 5/6 | 1.34 |
| 6/7 | 1.17 |

|  | Ratios | 150 | 151 | 154 | 156 | 158 | 160 |
|---|---|---|---|---|---|---|---|
| Reverse | -2.70 |  | X | X | X | X |  |
| Neutral | 0.00 |  | X | X |  | X |  |
| 1 | 4.09 |  | X | X |  | X | X |
| 2 | 2.18 |  | X | X | X |  | X |
| 3 | 1.67 | X | X | X |  |  | X |
| 4 | 1.32 | X |  | X | X |  | X |
| 5 | 1.00 | X | X |  | X |  | X |
| 6 | 0.73 | X |  |  | X | X | X |
| 7 | 0.62 | X | X |  |  | X | X |

(X = engaged)

Ring/Sun Tooth Ratios: $\frac{R1}{S1} = 2.70, \frac{R2}{S2} = 1.52, \frac{R3}{S3} = 1.53$

| Ratio Spread | 6.61 |
|---|---|
| Ratio Steps |  |
| Rev/1 | -0.66 |
| 1/2 | 1.88 |
| 2/3 | 1.30 |
| 3/4 | 1.27 |
| 4/5 | 1.32 |
| 5/6 | 1.37 |
| 6/7 | 1.18 |

|  | Ratios | 250 | 252 | 254 | 256 | 258 | 260 |
|---|---|---|---|---|---|---|---|
| Reverse | -2.99 |  | X | X | X | X |  |
| Neutral | 0.00 |  | X |  | X | X |  |
| 1 | 4.60 |  | X |  | X | X | X |
| 2 | 2.35 |  | X | X | X |  | X |
| 3 | 1.41 | X | X |  | X |  | X |
| 4 | 1.00 | X | X | X | X |  |  |
| 5 | 0.73 | X | X | X |  |  | X |
| 6 | 0.61 | X |  | X |  | X | X |
| 7 | 0.54 | X | X |  |  | X | X |

(X = engaged)

Ring/Sun Tooth Ratios $\frac{R1}{S1} = 1.54, \frac{R2}{S2} = 2.99, \frac{R3}{S3} = 2.96$

| Ratio Spread | 8.58 |
|---|---|
| Ratio Steps |  |
| Rev/1 | -0.65 |
| 1/2 | 1.96 |
| 2/3 | 1.66 |
| 3/4 | 1.41 |
| 4/5 | 1.37 |
| 5/6 | 1.20 |
| 6/7 | 1.13 |

|  | Ratios | 350 | 352 | 354 | 356 | 358 | 360 |
|---|---|---|---|---|---|---|---|
| Reverse | -2.95 | X |  | X |  | X | X |
| Neutral | 0.00 | X |  | X |  |  | X |
| 1 | 4.31 | X | X | X |  |  | X |
| 2 | 2.65 |  | X | X | X |  | X |
| 3 | 1.51 | X |  | X | X |  | X |
| 4 | 1.00 | X |  | X | X | X |  |
| 5 | 0.90 | X |  |  | X | X | X |
| 6 | 0.67 |  | X |  | X | X | X |
| 7 | 0.62 | X | X |  |  | X | X |

(X = engaged)

Ring/Sun Tooth Ratios $\frac{R1}{S1} = 2.95, \frac{R2}{S2} = 2.99, \frac{R3}{S3} = 2.96$

| Ratio Spread | 6.92 |
|---|---|
| Ratio Steps |  |
| Rev/1 | -0.68 |
| 1/2 | 1.63 |
| 2/3 | 1.75 |
| 3/4 | 1.51 |
| 4/5 | 1.11 |
| 5/6 | 1.34 |
| 6/7 | 1.08 |

| | Ratios | 450 | 452 | 454 | 456 | 458 | 460 |
|---|---|---|---|---|---|---|---|
| Reverse | -2.95 | | X | X | | X | X |
| Neutral | 0.00 | | X | | | X | X |
| 1 | 4.55 | | X | | X | X | X |
| 2 | 2.12 | | X | X | X | | X |
| 3 | 1.57 | X | X | | X | | X |
| 4 | 1.28 | X | | | X | X | X |
| 5 | 1.00 | X | X | X | X | | |
| 6 | 0.75 | X | | X | X | X | |
| 7 | 0.64 | X | X | | X | X | |

(X = engaged)

Ring/Sun Tooth Ratios: $\frac{R1}{S1}=2.95, \frac{R2}{S2}=1.53, \frac{R3}{S3}=1.54$

| Ratio Spread | 7.09 |
|---|---|
| Ratio Steps | |
| Rev/1 | -0.65 |
| 1/2 | 2.14 |
| 2/3 | 1.35 |
| 3/4 | 1.23 |
| 4/5 | 1.28 |
| 5/6 | 1.34 |
| 6/7 | 1.16 |

| | Ratios | 550 | 552 | 554 | 556 | 558 | 560 |
|---|---|---|---|---|---|---|---|
| Reverse | -2.36 | | X | | X | X | X |
| Neutral | 0.00 | | X | | | X | X |
| 1 | 4.34 | | X | X | | X | X |
| 2 | 2.84 | | X | X | X | X | |
| 3 | 1.72 | X | X | X | | X | |
| 4 | 1.17 | X | X | | X | X | |
| 5 | 1.00 | X | X | X | X | | |
| 6 | 0.82 | X | X | | X | | X |
| 7 | 0.61 | X | | X | X | | X |

(X = engaged)

Ring/Sun Tooth Ratios $\frac{R1}{S1}=1.54, \frac{R2}{S2}=1.54, \frac{R3}{S3}=1.89$

| Ratio Spread | 7.15 |
|---|---|
| Ratio Steps | |
| Rev/1 | -0.54 |
| 1/2 | 1.53 |
| 2/3 | 1.65 |
| 3/4 | 1.47 |
| 4/5 | 1.17 |
| 5/6 | 1.22 |
| 6/7 | 1.35 |

| | Ratios | 650 | 652 | 654 | 656 | 658 | 660 |
|---|---|---|---|---|---|---|---|
| Reverse | -2.95 | | X | | X | X | X |
| Neutral | 0.00 | | X | | | X | X |
| 1 | 4.46 | | X | X | | X | X |
| 2 | 2.12 | | X | X | X | | X |
| 3 | 1.58 | X | X | X | | | X |
| 4 | 1.28 | X | | X | X | | X |
| 5 | 1.00 | X | X | X | X | | |
| 6 | 0.75 | X | | X | X | X | |
| 7 | 0.64 | X | X | X | | X | |

*(X = engaged)*

Ring/Sun Tooth Ratios: $\frac{R1}{S1} = 1.53, \frac{R2}{S2} = 2.95, \frac{R3}{S3} = 1.51$

| Ratio Spread | 6.97 |
|---|---|
| Ratio Steps | |
| Rev/1 | -0.66 |
| 1/2 | 2.10 |
| 2/3 | 1.34 |
| 3/4 | 1.23 |
| 4/5 | 1.28 |
| 5/6 | 1.34 |
| 6/7 | 1.17 |

|   | Ratios | 750 | 752 | 754 | 756 | 758 | 760 |
|---|---|---|---|---|---|---|---|
| Reverse | -3.97 |  | X | X |  | X | X |
| Neutral | 0.00 |  | X |  |  | X | X |
| 1 | 4.61 |  | X |  | X | X | X |
| 2 | 2.21 |  | X | X | X | X |  |
| 3 | 1.65 | X | X |  | X | X |  |
| 4 | 1.34 | X | X | X |  | X |  |
| 5 | 1.00 | X | X | X | X |  |  |
| 6 | 0.72 | X |  | X | X |  | X |
| 7 | 0.62 | X | X | X |  |  | X |

*(X = engaged)*

Ring/Sun Tooth Ratios: $\frac{R1}{S1} = 1.54, \frac{R2}{S2} = 2.56, \frac{R3}{S3} = 1.80$

| Ratio Spread | 7.41 |
|---|---|
| Ratio Steps |  |
| Rev/1 | -0.86 |
| 1/2 | 2.09 |
| 2/3 | 1.34 |
| 3/4 | 1.23 |
| 4/5 | 1.34 |
| 5/6 | 1.39 |
| 6/7 | 1.16 |

| | Ratios | 850 | 852 | 854 | 856 | 858 | 860 |
|---|---|---|---|---|---|---|---|
| Reverse | -1.83 | | X | X | | X | X |
| Neutral | 0.00 | | X | | | X | X |
| 1 | 3.94 | | X | | X | X | X |
| 2 | 2.72 | X | | | X | X | X |
| 3 | 1.63 | X | X | | X | | X |
| 4 | 1.34 | X | | X | X | | X |
| 5 | 1.00 | X | X | X | X | | |
| 6 | 0.69 | X | | X | X | X | |
| 7 | 0.59 | X | X | X | | X | |

(X = engaged)

Ring/Sun Tooth Ratios $\frac{R1}{S1} = 2.24, \frac{R2}{S2} = 2.99, \frac{R3}{S3} = 1.83$

| Ratio Spread | 6.66 |
|---|---|
| Ratio Steps | |
| Rev/1 | -0.46 |
| 1/2 | 1.45 |
| 2/3 | 1.66 |
| 3/4 | 1.22 |
| 4/5 | 1.34 |
| 5/6 | 1.45 |
| 6/7 | 1.17 |

| | Ratios | 950 | 952 | 954 | 956 | 958 | 960 |
|---|---|---|---|---|---|---|---|
| Reverse | -1.18 | | X | | X | X | X |
| Neutral | 0.00 | | X | | X | X | |
| 1 | 2.53 | | X | X | X | X | |
| 2 | 1.54 | | X | X | X | | X |
| 3 | 1.00 | X | X | X | X | | |
| 4 | 0.69 | X | X | | X | | X |
| 5 | 0.57 | X | X | X | | | X |
| 6 | 0.43 | X | X | | | X | X |
| 7 | 0.32 | X | | X | | X | X |

(X = engaged)

Ring/Sun Tooth Ratios $\frac{R1}{S1} = 2.15, \frac{R2}{S2} = 1.53, \frac{R3}{S3} = 1.83$

| Ratio Spread | 7.98 |
|---|---|
| Ratio Steps | |
| Rev/1 | -0.47 |
| 1/2 | 1.64 |
| 2/3 | 1.54 |
| 3/4 | 1.46 |
| 4/5 | 1.20 |
| 5/6 | 1.31 |
| 6/7 | 1.37 |

| | Ratios | 1050 | 1052 | 1054 | 1056 | 1058 | 1060 |
|---|---|---|---|---|---|---|---|
| Reverse | -1.62 | | X | | X | X | X |
| Neutral | 0.00 | | X | | X | | X |
| 1 | 2.42 | | X | X | X | | X |
| 2 | 1.43 | | X | X | X | X | |
| 3 | 1.00 | X | X | X | X | | |
| 4 | 0.70 | X | | X | X | X | |
| 5 | 0.48 | X | X | X | | X | |
| 6 | 0.37 | X | | X | | X | X |
| 7 | 0.32 | X | X | X | | | X |

*(X = engaged)*

Ring/Sun Tooth Ratios $\frac{R1}{S1} = 1.68, \frac{R2}{S2} = 1.72, \frac{R3}{S3} = 2.94$

| Ratio Spread | 7.50 |
|---|---|
| Ratio Steps | |
| Rev/1 | -0.67 |
| 1/2 | 1.70 |
| 2/3 | 1.43 |
| 3/4 | 1.43 |
| 4/5 | 1.45 |
| 5/6 | 1.30 |
| 6/7 | 1.15 |

|  | Ratios | 1150 | 1152 | 1154 | 1156 | 1158 | 1160 |
|---|---|---|---|---|---|---|---|
| Reverse | -1.37 | X | X |  | X |  | X |
| Neutral | 0.00 |  | X |  |  |  | X |
| 1 | 2.42 |  | X | X |  | X | X |
| 2 | 1.56 |  | X | X | X |  | X |
| 3 | 1.00 | X | X | X | X |  |  |
| 4 | 0.81 | X |  | X | X |  | X |
| 5 | 0.52 | X |  | X |  | X | X |
| 6 | 0.39 | X |  |  | X | X | X |
| 7 | 0.33 | X | X |  |  | X | X |

(X = engaged clutch)

Ring/Sun Tooth Ratios $\frac{R1}{S1} = 1.54, \frac{R2}{S2} = 1.50, \frac{R3}{S3} = 2.96$

| Ratio Spread | 7.23 |
|---|---|
| Ratio Steps |  |
| Rev/1 | -0.56 |
| 1/2 | 1.55 |
| 2/3 | 1.56 |
| 3/4 | 1.23 |
| 4/5 | 1.56 |
| 5/6 | 1.32 |
| 6/7 | 1.18 |

|  | Ratios | 1250 | 1252 | 1254 | 1256 | 1258 | 1260 |
|---|---|---|---|---|---|---|---|
| Reverse | -1.04 | X | X |  |  | X | X |
| Neutral | 0.00 | X |  |  |  | X | X |
| 1 | 2.12 | X |  |  | X | X | X |
| 2 | 1.43 |  | X |  | X | X | X |
| 3 | 1.00 |  | X | X | X | X |  |
| 4 | 0.83 |  | X | X | X |  | X |
| 5 | 0.56 | X |  | X | X |  | X |
| 6 | 0.43 | X | X | X |  |  | X |
| 7 | 0.29 | X |  | X |  | X | X |

(X = engaged)

Ring/Sun Tooth Ratios $\frac{R1}{S1} = 2.47, \frac{R2}{S2} = 1.52, \frac{R3}{S3} = 2.09$

| Ratio Spread | 7.34 |
|---|---|
| Ratio Steps |  |
| Rev/1 | -0.49 |
| 1/2 | 1.48 |
| 2/3 | 1.43 |
| 3/4 | 1.21 |
| 4/5 | 1.49 |
| 5/6 | 1.31 |
| 6/7 | 1.48 |

| | Ratios | 1350 | 1352 | 1354 | 1356 | 1358 | 1360 |
|---|---|---|---|---|---|---|---|
| Reverse | -1.90 | | X | X | | X | X |
| Neutral | 0.00 | | X | X | | | X |
| 1 | 2.78 | | X | X | X | | X |
| 2 | 1.34 | | X | X | X | X | |
| 3 | 1.00 | X | X | X | X | | |
| 4 | 0.81 | X | | X | X | X | |
| 5 | 0.64 | X | X | | X | X | |
| 6 | 0.48 | X | | | X | X | X |
| 7 | 0.41 | X | X | | X | | X |

*(X = engaged)*

Ring/Sun Tooth Ratios $\frac{R1}{S1} = 2.99, \frac{R2}{S2} = 2.74, \frac{R3}{S3} = 1.54$

| Ratio Spread | 6.84 |
|---|---|
| Ratio Steps | |
| Rev/1 | -0.68 |
| 1/2 | 2.08 |
| 2/3 | 1.34 |
| 3/4 | 1.23 |
| 4/5 | 1.28 |
| 5/6 | 1.34 |
| 6/7 | 1.17 |

| | Ratios | 1450 | 1452 | 1454 | 1456 | 1458 | 1460 |
|---|---|---|---|---|---|---|---|
| Reverse | -1.73 | X | | X | | X | X |
| Neutral | 0.00 | | | X | | X | |
| 1 | 2.95 | X | | X | X | X | |
| 2 | 1.33 | X | | X | X | | X |
| 3 | 1.00 | X | X | X | X | | |
| 4 | 0.83 | | X | X | X | | X |
| 5 | 0.65 | X | X | | X | | X |
| 6 | 0.47 | | X | | X | X | X |
| 7 | 0.41 | X | X | | X | X | |

(X = engaged)

Ring/Sun Tooth Ratios $\frac{R1}{S1} = 1.68, \frac{R2}{S2} = 2.67, \frac{R3}{S3} = 1.83$

| Ratio Spread | 7.27 |
|---|---|
| Ratio Steps | |
| Rev/1 | -0.59 |
| 1/2 | 2.22 |
| 2/3 | 1.33 |
| 3/4 | 1.20 |
| 4/5 | 1.29 |
| 5/6 | 1.37 |
| 6/7 | 1.16 |

| | Ratios | 1550 | 1552 | 1554 | 1556 | 1558 | 1560 |
|---|---|---|---|---|---|---|---|
| Reverse | -5.44 | | X | | X | X | X |
| Neutral | 0.00 | | X | | X | | X |
| 1 | 3.02 | | X | X | X | | X |
| 2 | 1.92 | | X | X | X | X | |
| 3 | 1.00 | X | X | X | X | | |
| 4 | 0.82 | X | | X | X | X | |
| 5 | 0.68 | X | X | X | | X | |
| 6 | 0.61 | X | X | X | | | X |
| 7 | 0.42 | X | X | | X | | X |

(X = engaged)

Ring/Sun Tooth Ratios $\frac{R1}{S1} = 1.54, \frac{R2}{S2} = 2.53, \frac{R3}{S3} = 1.97$

| Ratio Spread | 7.20 |
|---|---|
| Ratio Steps | |
| Rev/1 | -1.80 |
| 1/2 | 1.57 |
| 2/3 | 1.92 |
| 3/4 | 1.22 |
| 4/5 | 1.20 |
| 5/6 | 1.13 |
| 6/7 | 1.44 |

| | Ratios | 1650 | 1652 | 1654 | 1656 | 1658 | 1660 |
|---|---|---|---|---|---|---|---|
| Reverse | -5.71 | | X | | X | X | X |
| Neutral | 0.00 | | X | | X | X | |
| 1 | 3.09 | | X | X | X | X | |
| 2 | 1.98 | | X | X | X | | X |
| 3 | 1.00 | X | X | X | X | | |
| 4 | 0.82 | X | | X | X | | X |
| 5 | 0.68 | X | X | X | | | X |
| 6 | 0.61 | X | X | X | | X | |
| 7 | 0.42 | X | X | | X | X | |

(X = engaged)

Ring/Sun Tooth Ratios $\frac{R1}{S1} = 1.89, \frac{R2}{S2} = 1.54, \frac{R3}{S3} = 2.70$

| Ratio Spread | 7.31 |
|---|---|
| Ratio Steps | |
| Rev/1 | -1.85 |
| 1/2 | 1.57 |
| 2/3 | 1.98 |
| 3/4 | 1.22 |
| 4/5 | 1.20 |
| 5/6 | 1.12 |
| 6/7 | 1.43 |

MULTI-SPEED TRANSMISSION MECHANISMS WITH THREE PLANETARY GEARSETS AND INPUT CLUTCHES

TECHNICAL FIELD

This invention relates to multi-speed planetary type power transmissions and, more particularly, to planetary transmissions providing at least seven forward speed ratios and one reverse speed ratio.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. Seven-speed power transmissions offer further improvements in vehicle acceleration performance and fuel economy over six-speed transmissions, but they have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission, but many of these seven-speed transmissions do not offer very good ratio progressions.

SUMMARY OF THE INVENTION

It is an object of the present invention to provide a low content seven-speed power transmission with good ratio progressions requiring three planetary gearsets and six actively engageable transmission mechanisms.

In one aspect of the present invention, the number of planetary gearsets utilized in the planetary gear arrangement is held at three planetary gearsets.

In another aspect of the present invention, a family of seven-speed power transmissions utilizes six torque-transmitting mechanisms which are represented by four clutches and two brakes, or five clutches and one brake.

In another aspect of the present invention, each planetary gearset employs three members comprised of sun gear members, ring gear members, and planet carrier assembly members.

In yet another aspect of the present invention, the first member of the first planetary gearset is continuously interconnected with the first member of the second planetary gearset.

In still another aspect of the present invention, a second member of the second planetary gearset is continuously interconnected with a first member of the third planetary gearset through a fixed interconnection.

In yet still a further aspect of the present invention, the output shaft of the transmission is continuously connected with at least one member of one of the planetary gearsets.

In yet still another aspect of the present, a first and second of the rotating torque-transmitting mechanisms selectively interconnect the input shaft with members of the planetary gearsets or one of the fixed interconnections.

In a further aspect of the present invention, a third of the torque-transmitting mechanisms selectively interconnects a member of one of the planetary gearsets with the output shaft, or another member of one of the planetary gearsets.

In yet a further aspect of the present invention, a fourth of the torque-transmitting mechanisms selectively connects a member of one of the planetary gearsets with another member of one of the planetary gearsets.

In a still further aspect of the present invention, a fifth of the torque-transmitting mechanisms selectively connects a member of one of the planetary gearsets with a stationary member of the transmission, such as a transmission housing.

In a yet still further aspect of the present invention, a sixth of the torque-transmitting mechanisms selectively interconnects a member of the first or third planetary gearset with another member of one of the planetary gearsets, or selectively connects a member of one of the planetary gearsets with a stationary member of the transmission.

In a yet still further aspect of the present invention, the six torque-transmitting mechanisms are selectively engageable in combinations of four to establish at least seven forward speed ratioSand one reverse speed ratio between an input shaft and the output shaft of the transmission.

By utilizing only three planetary gearsets and six torque-transmitting mechanisms, which are arranged between an input shaft and an output shaft of the power transmission, the present invention has therein a minimum of mechanical components, which must be assembled in a transmission housing. Thus, the transmission assembly is no more complex, except for one additional torque transmitting mechanism, than many of the five- or six-speed power transmissions presently proposed as useful in automobiles. Moreover, the present invention provides for a family of transmissions, incorporating the minimum mechanical component requirement and offering good ratio progressions.

It is also an advantage of the present invention, that each of these transmissions provides single transition interchanges between adjacent forward speed ratios. This greatly simplifies the control function of the transmission since it is only necessary to disengage one torque-transmitting mechanism while engaging the other. Those skilled in the art will recognize that this is the control function generally found in most of today's useful automatic power transmissions.

DESCRIPTION OF THE EXEMPLARY EMBODIMENTS

Figures 1, 2:
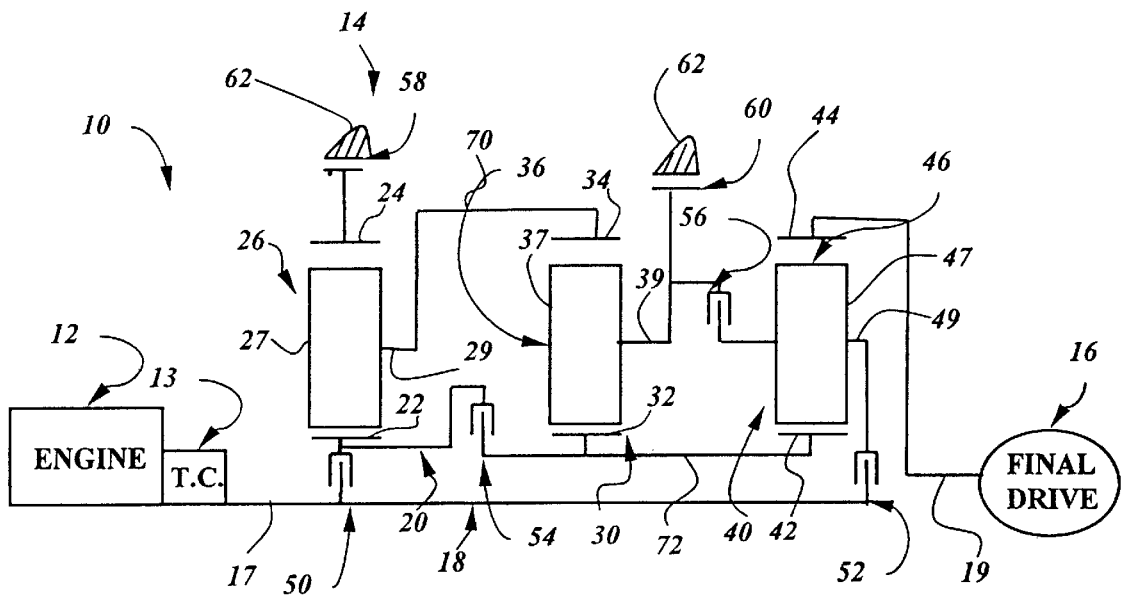
FIG. 1 is a schematic representation of a power transmission incorporating one embodiment of the present invention.
FIG. 2 is a truth table and chart describing the shift sequence and an example of the numerical values available the embodiment shown in FIG. 1.

Referring to the drawings, wherein like characters represent the same or corresponding parts throughout the several views, there is seen in FIG. 1 a powertrain 10 including an engine 12, a torque converter 13, a planetary transmission 14, and a final drive mechanism 16. The planetary transmission 14 includes an input shaft 17, a planetary gear arrangement 18, and an output shaft 19. The planetary gear arrangement 18 includes three planetary gearsets 20, 30, and 40.

The planetary gearset 20 includes a sun gear member 22, a ring gear member 24, and a planet carrier assembly member 26. The planet carrier assembly member 26 includes a plurality of pinion gears 27 that are rotatably mounted on a planet carrier member 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 that are rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 that are rotatably mounted on a planet carrier member 49 and disposed in meshing relationship with both the sun gear member 42 and the ring gear member 44.

Each of the planetary gearsets 20, 30, and 40 are represented in the schematic representation with a single pinion member. However, as is well known, planetary gearsets are manufactured with planet carrier assemblies having three or four pinion gear members equi-angularly spaced on the planet carrier member. In some members of the transmission family being described herein, the planet carrier assembly members will incorporate dual pinion assemblies wherein meshing pinion gear members are mounted in pairs on each carrier, such that the pinions mesh with respective sun gears and ring gears. These assemblies will be described later when their particular embodiment is being described.

The planetary gear arrangement 18 also includes six torque-transmitting mechanisms 50, 52, 54, 56, 58, and 60. The torque-transmitting mechanisms 50, 52, 54, and 56 are rotating type torque-transmitting mechanisms, commonly termed clutches, and the torque-transmitting mechanisms 58 and 60 are stationary type torque-transmitting mechanisms, commonly termed brakes.

The planet carrier assembly member 26 is continuously connected through an interconnecting member 70 with the ring gear member 34. The sun gear member 32 is continuously interconnected with the sun gear member 42 through an interconnecting member 72. The input shaft 17 is selectively connectible with the sun gear member 22 through the torque-transmitting mechanism 50, and selectively connectible with the planet carrier assembly member 46 through the torque-transmitting mechanism 52. The sun gear member 22 is selectively interconnectible with the interconnecting member 72 through the torque-transmitting mechanism 54.

The planet carrier assembly member 36 is selectively interconnectible with the planet carrier assembly member 46 through the torque-transmitting mechanism 56. The ring gear member 24 is selectively connectible with a transmission housing 62 through the torque-transmitting mechanism 58. The torque-transmitting mechanism 60 selectively interconnects the planet carrier assembly member 36 with the transmission housing 62. The ring gear member 44 is continuously connected with the output shaft 19.

The input shaft 17 is shown as being continuously connected with the engine 12 and torque converter 13. However, if the first forward speed ratio has a high ratio number, the torque converter 13 can be eliminated and the respective torque-transmitting mechanisms can be utilized as starting devices. Or, if desired, a separate starting device other than a torque converter might be employed.

As seen in FIG. 2, the truth table describes the engagement combinations of the torque-transmitting mechanisms, which will establish a reverse speed ratio and seven forward speed ratios through the planetary gear arrangement 18 between the input shaft 17 and the output shaft 19.

During the reverse speed ratio, the torque-transmitting mechanisms 50, 54, 56, and 60 are employed. With this combination of engagements, the input shaft 17 is connected directly with all three sun gear members 22, 32, and 42. The planet carrier assembly member 46 and planet carrier assembly member 36 are selectively interconnected with the transmission housing 62 through the torque-transmitting mechanisms 56 and 60. The ring gear member 44 will drive the final drive mechanism 16 and therefore the vehicle, not shown, connected therewith in the reverse direction relative to the engine 12 at a speed determined by the speed of the sun gear member 42 and the ring gear/sun gear tooth ratio of the planetary gearset 40. Therefore, the numerical value of the reverse speed ratio is determined by the ring gear/sun gear tooth ratio of the planetary gearset 40.

As seen in FIG. 2, the ring gear/sun gear tooth ratios are represented by the ratios R1/S1, R2/S2, and R3/S3, which represent the tooth ratios of the planetary gearsets 20, 30, and 40, respectively.

The first forward speed ratio is established with the engagement of the torque-transmitting mechanisms 50, 56, 58, and 60. During the first forward speed ratio, the sun gear member 22 is driven by the input shaft 17, the planet carrier assembly member 36 and planet carrier assembly member 46 are connected with the transmission housing 62, and the ring gear member 24 is also connected with the transmission housing 62. During the first forward speed ratio, the planet carrier assembly member 26 and the ring gear member 34 are driven at a speed determined by the speed of the sun gear member 22 and the ring gear/sun gear tooth ratio of the planetary gearset 20. The sun gear members 32 and 42 are driven at a speed determined by the speed of the ring gear member 34 and the ring gear/sun gear tooth ratio of the planetary gearset 30. The ring gear member 44 and therefore output shaft 19 are driven at a speed determined by the speed of the sun gear member 42 and the ring gear/sun gear tooth ratio of the planetary gearset 40. The numerical value of the first forward speed ratio is determined by ring gear/sun gear tooth ratios of all three planetary gearsets 20, 30, and 40.

The second forward speed ratio is established with the engagement of the torque-transmitting mechanisms 50, 54, 56, and 58. During the second forward speed ratio, the sun gear members 22, 32, and 42 are all driven directly by the input shaft 17. The planet carrier assembly member 26 and ring gear member 34 are driven at a speed determined by the speed of the sun gear member 22 and the ring gear/sun gear tooth ratio of the planetary gearset 20. The planet carrier assembly members 36 and 46 are driven at a speed determined by the speed of the ring gear member 34, the speed of the sun gear member 32, and the ring gear/sun gear tooth ratio of the planetary gearset 30. The ring gear member 44 and therefore output shaft 19 are driven at a speed determined by the speed of the sun gear member 42, the speed of the planet carrier assembly member 46, and the ring gear/sun gear tooth ratio of the planetary gearset 40. The numerical value of the second forward speed ratio is determined by the ring gear/sun gear tooth ratios of all three planetary gearsets 20, 30, and 40.

The third forward speed ratio is established with the engagement of the torque-transmitting mechanisms 50, 52, 56, and 58. During the third forward speed ratio, the sun gear member 22, planet carrier assembly member 36, and planet carrier assembly member 46 are all driven by the input shaft 17. The planet carrier assembly member 26 and ring gear member 34 are rotated at a speed determined by the speed of the sun gear member 22 and the ring gear/sun gear tooth ratio of the planetary gearset 20. The sun gear members 32 and 42 are rotated at a speed determined by the speed of the planet carrier assembly member 36, the speed of ring gear member 34, and the ring gear/sun gear tooth ratio of the planetary gearset 30. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 52, 54, 56, and 58. During the fourth forward speed ratio, the planet carrier assembly member 36 and planet carrier assembly member 46 are driven by the input shaft 17. The speed of the ring gear member 34 and planet carrier assembly member 26 are determined by the speed of the planet carrier assembly member 36, the speed of the sun gear member 32, and ring gear/sun gear tooth ratio of the planetary gearset 30. The speed of the sun gear members 22, 32, and 42 are determined by the speed of the planet carrier assembly member 26 and the ring gear/sun gear tooth ratio of the planetary gearset 20. The speed of the ring gear member 44 and therefore output shaft 19 are determined by the speed of the planet carrier assembly member 46, the speed of the sun gear member 42, and the ring gear/sun gear tooth ratio of the planetary gearset 40. The numerical value of the fourth forward speed ratio is determined by the ring gear/sun gear tooth ratios of all three planetary gearsets 20, 30, and 40.

The fifth forward speed ratio is established with the engagement of the torque-transmitting mechanisms 50, 52, 54, and 58. During the fifth forward speed ratio, the sun gear member 42 and planet carrier assembly member 46 are both rotated by the input shaft 17 which results in rotation of the ring gear member 44 and therefore output shaft 19 at the same speed as the input shaft 17. The numerical value of the fifth forward speed ratio is therefore one.

The sixth forward speed ratio is established with the engagement of the torque-transmitting mechanisms 52, 54, 58, and 60. During the sixth forward speed ratio, the planet carrier assembly member 46 is driven by the input shaft 17 and the sun gear member 42 is held stationary. The speed of the ring gear member 44 and therefore output shaft 19 is determined by the speed of the planet carrier assembly member 46 and the ring gear/sun gear tooth ratio of the planetary gearset 40. The numerical value of the sixth forward speed ratio is determined by the planetary gearset 40.

The seventh forward speed ratio is established with the engagement of the torque-transmitting mechanisms 50, 52, 58, and 60. During the seventh forward speed ratio, the sun gear member 22 and planet carrier assembly member 46 are driven by the input shaft 17. The speed of the planet carrier assembly member 26 and the ring gear member 34 are determined by the speed of the sun gear member 22 and the ring gear/sun gear tooth ratio of the planetary gearset 20. The speed of the sun gear members 32 and 42 are determined by the speed of the ring gear member 34 and the ring gear/sun gear tooth ratio of the planetary gearset 30. The speed of the ring gear member 44 and therefore output shaft 19 are determined by the speed of the planet carrier assembly member 46, the speed of the sun gear member 42, and the ring gear/sun gear tooth ratio of the planetary gearset 40. The numerical value of the seventh forward speed ratio is determined by the ring gear/sun gear tooth ratios of all three planetary gearsets 20, 30, and 40.

The truth table of FIG. 2 describes or gives an example of the speed ratios for each of the seven forward speeds as well as the reverse speed when the tooth ratio numbers of the planetary gearsets 20, 30, and 40 as represented by R1/S1, R2/S2, and R3/S3, respectively, are utilized. FIG. 2 also describes any numerical value for the ratio steps between adjacent forward speed ratios as well as between the reverse and first forward speed ratio. This chart also provides the overall ratio spread in the forward direction.

Figures 3, 4:
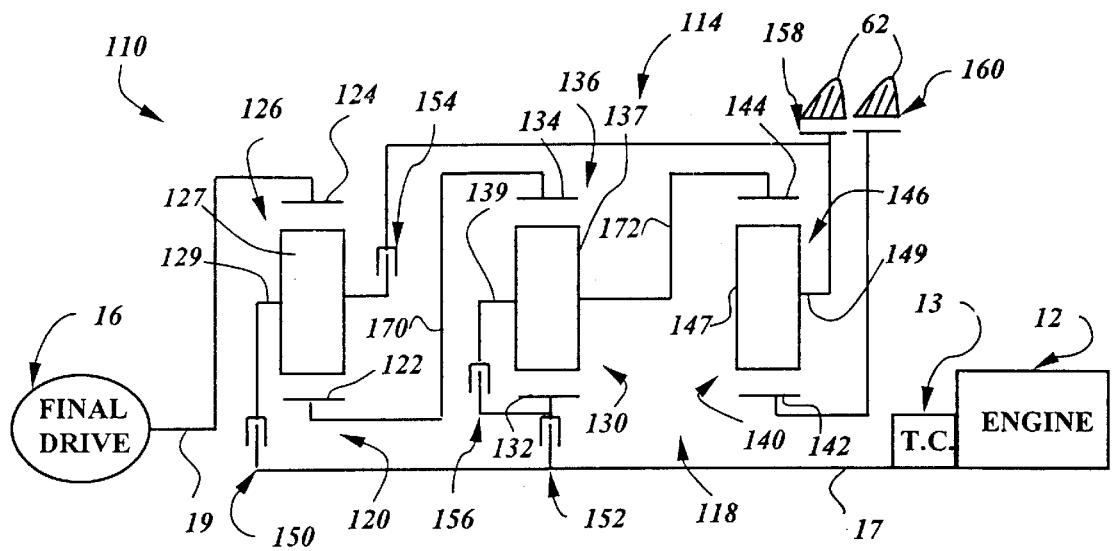
FIG. 3 is a schematic representation of a power transmission incorporating another embodiment of the present invention.
FIG. 4 is a truth table and chart describing the shift sequence and an example of the numerical values available for the embodiment shown in FIG. 3.

A powertrain 110 described in FIG. 3, includes the engine 12, torque converter 13, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140 and six torque-transmitting mechanisms 150, 152, 154, 156, 158, and 160. The torque-transmitting mechanisms 150, 152, 154, and 156 are rotating type torque-transmitting mechanisms, and the torque-transmitting mechanisms 158 and 160 are stationary type torque-transmitting mechanisms.

The planetary gearset 120 includes a sun gear member 122, a ring gear member 124, and a planet carrier assembly member 126. The planet carrier assembly member 126 includes a plurality of pinion gears 127 which are rotatably mounted on planet carrier member 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 that are rotatably mounted on a planet carrier member 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 that are rotatably mounted on a planet carrier member 149 and disposed in meshing relationship with both the sun gear member 142 and the ring gear member 144.

The sun gear member 122 is continuously connected with the ring gear member 134 through an interconnecting member 170. The planet carrier assembly member 136 is continuously interconnected with the ring gear member 144 through an interconnecting member 172. The ring gear member 124 is continuously connected with the output shaft 19.

The input shaft 17 is selectively connectible with the planet carrier assembly member 126 through the torque-transmitting mechanism 150, and selectively connectible with the sun gear member 132 through the torque-transmitting mechanism 152. The planet carrier assembly member 126 is selectively interconnectible with the planet carrier assembly member 146 through the torque-transmitting mechanism 154. The sun gear member 132 is selectively connectible with the interconnecting member 172 through the torque-transmitting mechanism 156. The planet carrier assembly member 146 is selectively connectible with the transmission housing 62 through the torque-transmitting mechanism 158. The sun gear member 142 is selectively connectible with the transmission housing 62 through the torque-transmitting mechanism 160. It should be noted that the engagement of the torque-transmitting mechanism 156 will cause the planetary gearset 130 to rotate as a single unit.

The truth table of FIG. 4 describes the combination of engagements for the torque-transmitting mechanisms to establish the reverse speed ratio and seven forward speed ratios. The truth table also provides an example of numerical values that are available with the planetary gear arrangement shown in FIG. 3 and the ring gear/sun gear tooth ratios of the planetary gearsets 120, 130, and 140, as represented in the ratios R1/S1, R2/S2, and R3/S3, respectively. Also provided in FIG. 4 is a chart that depicts the ratio steps between adjacent forward speed ratios when the example numerical speed ratios are employed. The chart of FIG. 4 also describes the overall ratio spread for the forward speed ratios.

The reverse speed ratio is established with the engagement of the torque-transmitting mechanisms 152, 154, 156, and 158. During the reverse speed ratio, the planetary gearset 130 and sun gear member 122 rotate in unison with the input shaft 17. The planet carrier assembly member 126 is held stationary through the combination of torque-transmitting mechanisms 154 and 158. The ring gear member 124 and therefore output shaft 19 are rotated at a speed determined by the speed of the sun gear member 122 and the ring gear/sun gear tooth ratio of the planetary gearset 120. The numerical value of the reverse speed ratio is determined by the ring gear/sun gear tooth ratio of the planetary gearset 120. As can be readily seen in FIG. 4, the reverse speed ratio is equal to the R1/S1 tooth ratio which is equal to 2.70.

The first forward speed ratio is established with the engagement of the torque-transmitting mechanisms 152, 154, 158, and 160. During the first forward speed ratio, the sun gear member 132 is driven by the input shaft 17 while the planet carrier assembly members 136 and 126 are held stationary by the combination of engagements of the torque-transmitting mechanisms 154, 158, and 160. The ring gear member 134 and sun gear member 122 are rotated at a speed determined by the speed of the sun gear member 132 and the ring gear/sun gear tooth ratio of the planetary gearset 130. The ring gear member 124 and therefore output shaft 19 are rotated at a speed determined by the speed of the sun gear member 122 and the ring gear/sun gear tooth ratio of the planetary gearset 120. The numerical value of the first forward speed ratio is determined by the ring gear/sun gear tooth ratios of the planetary gearsets 130 and 120.

The second forward speed ratio is established with the engagement of the torque-transmitting mechanisms 152, 154, 156, and 160. During the second forward speed ratio, the planetary gearset 130, the ring gear member 144, and the sun gear member 122 all rotated in unison with the input shaft 17. The sun gear member 142 is held stationary. The planet carrier assembly members 146 and 126 are rotated at a speed determined by the speed of the ring gear member 144 and the ring gear/sun gear tooth ratio of the planetary gearset 140. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the second forward speed ratio is determined by the ring gear/sun gear tooth ratio of the planetary gearsets 120 and 140.

The third forward speed ratio is established with the engagement of the torque-transmitting mechanisms 150, 152, 154, and 160. During the third forward speed ratio, the planet carrier assembly members 126 and 146, and the sun gear member 132 are driven by the input shaft 17. The sun gear member 142 is held stationary. The ring gear member 144 and planet carrier assembly member 136 are rotated at a speed determined by the speed of the planet carrier assembly member 146 and the ring gear/sun gear tooth ratio of the planetary gearset 140. The ring gear member 134 and sun gear member 122 are rotated at a speed determined by the speed of the sun gear member 132, the speed of the planet carrier assembly member 136, and the ring gear/sun gear tooth ratio of the planetary gearset 130. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150, 154, 156, and 160. During the fourth forward speed ratio, the planet carrier assembly members 126 and 146 are rotated by the input shaft 17, the sun gear member 142 is held stationary, and the planetary gearset 130, ring gear member 144, and sun gear member 122 all rotate in unison. The ring gear member 144 and therefore sun gear member 122 are rotated at a speed determined by the speed of the planet carrier assembly member 146 and the ring gear/sun gear tooth ratio of the planetary gearset 140. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the fourth forward speed ratio is determined by the ring gear/sun gear tooth ratios of the planetary gearsets 120 and 140.

The fifth forward speed ratio is established with the engagement of the torque-transmitting mechanisms 150, 152, 156, and 160. During the fifth forward speed ratio, the planet carrier assembly member 126, the planetary gearset 130, and the sun gear member 122 all rotate in unison with the input shaft 17. Since the sun gear member 122 and planet carrier assembly member 126 rotate in unison with the input shaft 17, the ring gear member 124 and therefore output shaft 19 also rotate in unison with the input shaft 17. The numerical value of the fifth forward speed ratio is one.

The sixth forward speed ratio is established with the engagement of the torque-transmitting mechanisms 150, 156, 158, and 160. During the sixth forward speed ratio, the planet carrier assembly member 126 is driven directly by the input shaft 17, and the planetary gearset 130, the ring gear member 144, sun gear member 122 are all held stationary through the combination of engagements of the torque-transmitting mechanisms 156,158, and 160. The ring gear member 124 and therefore output shaft 19 are rotated at a speed determined by the speed of the planet carrier assembly member 126 and the ring gear/sun gear tooth ratio of the planetary gearset 120. The numerical value of the sixth forward speed ratio is determined by the ring gear/sun gear tooth ratio of the planetary gearset 120.

The seventh forward speed ratio is established with the engagement of the torque-transmitting mechanisms 150, 152, 158, and 160. During the seventh forward speed ratio, the planet carrier assembly member 126 and sun gear member 132 are driven in unison with the input shaft 17. The planetary gearset 140 and planet carrier assembly member 136 are held stationary by the torque-transmitting mechanisms 158 and 160. The ring gear member 134 and sun gear member 122 are rotated at a speed determined by the speed of the sun gear member 132 and the ring gear/sun gear tooth ratio of the planetary gearset 130. The ring gear member 124 and therefore output shaft 19 are rotated at a speed determined by the speed of the planet carrier assembly member 126, the speed of the sun gear member 122, and ring gear/sun gear tooth ratio of the planetary gearset 120. The numerical value of the seventh forward speed ratio is determined by the ring gear/sun gear tooth ratios of the planetary gearsets 120 and 130.

Figures 5, 6:
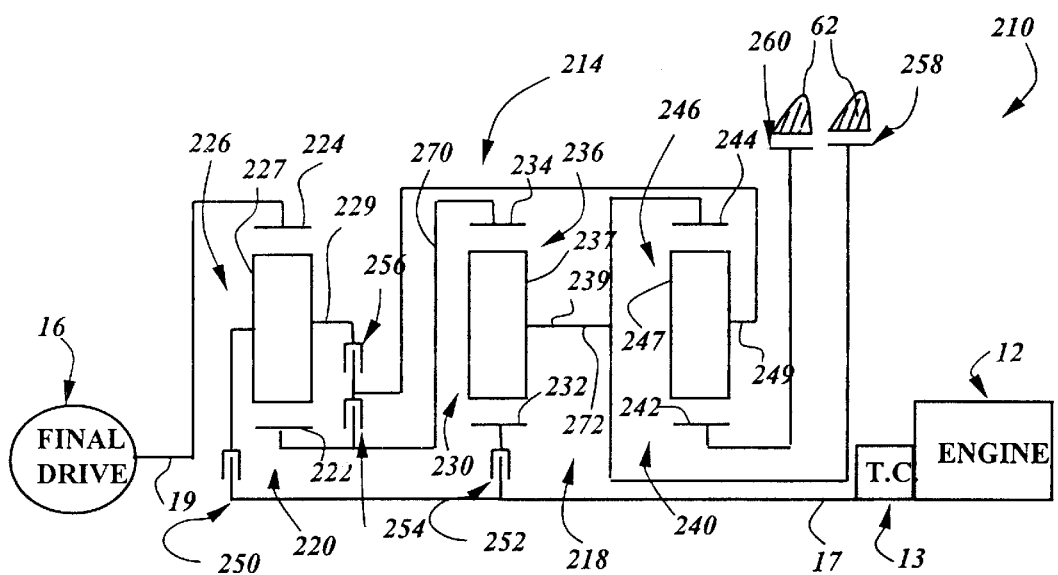
FIG. 5 is a schematic representation of a power transmission incorporating another embodiment of the present invention.
FIG. 6 is a truth table and chart describing the shift sequence and an example of the numerical values available for the embodiment shown in FIG. 5.

A powertrain 210 shown in FIG. 5 includes the engine 12, torque converter 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240 and six torque-transmitting mechanisms 250, 252, 254, 256, 258, and 260. The torque-transmitting mechanisms 250, 252, 254, and 256 are rotating type torque-transmitting mechanisms, and the torque-transmitting mechanisms 258 and 260 are stationary type torque-transmitting mechanisms.

The planetary gearset 220 includes a sun gear member 222, a ring gear member 224, and a planet carrier assembly member 226. The planet carrier assembly member 226 includes a plurality of pinion gears 227 which are rotatably mounted on planet carrier member 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 that are rotatably mounted on a planet carrier member 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 that are rotatably mounted on a planet carrier member 249 and disposed in meshing relationship with both the sun gear member 242 and the ring gear member 244.

The sun gear member 222 and ring gear member 234 are continuously interconnected by an interconnecting member 270. The planet carrier assembly member 236 and ring gear member 244 are continuously interconnected by an interconnecting member 272. The output shaft 19 is continuously connected with the ring gear member 224.

The input shaft 17 is selectively connectible with the planet carrier assembly member 226 through the torque-transmitting mechanism 250 and selectively connectible with the sun gear member 232 through the torque-transmitting mechanism 252. The sun gear member 222 is selectively connectible with the planet carrier assembly member 246 through the torque-transmitting mechanism 254. The planet carrier assembly member 226 is selectively connectible with the planet carrier assembly member 246 through the torque-transmitting mechanism 256. The interconnecting member 272 is selectively connectible with the transmission housing 62 through the torque-transmitting mechanism 258. The sun gear member 242 is selectively connectible with the transmission housing 62 through the torque-transmitting mechanism 260. It should be noted that the selective engagement of both torque-transmitting mechanisms 256 and 254 will cause the planetary gearset 220 to rotate in unison.

The truth table shown in FIG. 6 defines the combinations of engagements of the torque-transmitting mechanisms 250, 252, 254, 256, 258, and 260, which will establish the reverse speed ratio and seven forward speed ratios. The truth table also provides an example of numerical values for the reverse speed ratio and the seven forward speed ratios when the ring gear/sun gear tooth ratios of the planetary gearsets 220, 230, and 240 are as given in the ratios R1/S1, R2/S2, and R3/S3, respectively. Also provided in FIG. 6 is the numerical value of the ratio steps between adjacent forward speed ratios as well as between the reverse and first forward speed ratio when the numerical values given in the truth table are employed. The chart of FIG. 6 further provides the numerical value for the overall ratio spread of the seven forward speed ratios.

The reverse speed ratio is established with the engagement of the torque-transmitting mechanisms 252, 254, 256, and 258. During the reverse speed ratio, the sun gear member 232 is driven by the input shaft 17, and the planet carrier assembly member 236 and the ring gear member 244 are held stationary by the torque-transmitting mechanism 258. Both the sun gear member 222 and the planet carrier assembly member 226 rotate in unison with the ring gear member 234. The speed of the ring gear member 234 and therefore output shaft 19 rotate at a speed determined by the speed of the sun gear member 232 and the ring gear/sun gear tooth ratio of the planetary gearset 230. The numerical value of the reverse speed ratio is determined by the ring gear/sun gear tooth ratio of the planetary gearset 230.

The first forward speed ratio is established with the engagement of the torque-transmitting mechanisms 252, 256, 258, and 260. During the first forward speed ratio, the sun gear member 232 is driven by the input shaft 17. The planet carrier assembly member 226 and planet carrier assembly member 236 are both held stationary through the combination of engagements of the torque-transmitting mechanisms 256, 258, and 260. During the first forward speed ratio, the ring gear member 234 and sun gear member 222 are rotated at a speed determined by the speed of the sun gear member 232 and the ring gear/sun gear tooth ratio of the planetary gearset 230. The ring gear member 224 and therefore output shaft 19 are rotated at a speed determined by the speed of the sun gear member 222 and the ring gear/sun gear tooth ratio of the planetary gearset 220. The numerical value of the first forward speed ratio is determined by the ring gear/sun gear tooth ratios of the planetary gearsets 220 and 230.

The second forward speed ratio is established with the engagement of the torque-transmitting mechanisms 252, 254, 256, and 260. During the second forward speed ratio, the sun gear member 232 is driven directly by the input shaft 17. The planetary gearset 220 and the output shaft 19 are both driven at the same speed of the ring gear member 234. During the second forward speed ratio, the planet carrier assembly member 236 and ring gear member 244 are rotated at a speed determined by the speed of the sun gear member 232, the speed of the ring gear member 234, and the ring gear/sun gear tooth ratio of the planetary gearset 230. The planet carrier assembly member 246, ring gear member 234, and output shaft 19 are rotated at a speed determined by the speed of the ring gear member 244 and the ring gear/sun gear tooth ratio of the planetary gearset 240. The numerical value of the second forward speed ratio is determined by the ring gear/sun gear tooth ratios of the planetary gearsets 230 and 240.

The third forward speed ratio is established with the engagement of the torque-transmitting mechanisms 250, 252, 256, and 260. During the third forward speed ratio, the sun gear member 232, the planet carrier assembly member 226, and the planet carrier assembly member 246, are rotated at the same speed of the input shaft 17. The ring gear member 244 and planet carrier assembly member 236 are rotated at a speed determined by the speed of the planet carrier assembly member 246 and the ring gear/sun gear tooth ratio of the planetary gearset 240. The ring gear member 234 and sun gear member 222 are rotated at a speed determined by the speed of the sun gear member 232, the speed of the planet carrier assembly member 236, and the ring gear/sun gear tooth ratio of the planetary gearset 230. The ring gear member 224 and output shaft 19 are rotated at a speed determined by the speed of the planet carrier assembly member 226, the speed of the sun gear member 222, and the ring gear/sun gear tooth ratio of the planetary gearset 220. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 250, 252, 254, and 256. During the fourth forward speed ratio, the sun gear member 222 and planet carrier assembly member 226 are driven at the same speed of the input shaft 17. Therefore, the output shaft 19 and ring gear member 224 also rotate at this speed. The numerical value of the fourth forward speed ratio is one.

The fifth forward speed ratio is established with the engagement of the torque-transmitting mechanisms 250, 252, 254, and 260. During the fifth forward speed ratio, the sun gear member 232 and planet carrier assembly member 226 are rotated at the speed of the input shaft 17, and the sun gear member 242 is held stationary. The planet carrier assembly member 236 and ring gear member 244 are rotated at a speed determined by the speed of the sun gear member 232, the speed of the ring gear member 234, and the ring gear/sun gear tooth ratio of the planetary gearset 230. The planet carrier assembly member 246, ring gear member 234, and sun gear member 222 are rotated at a speed determined by the speed of the ring gear member 244 and the ring gear/sun gear tooth ratio of the planetary gearset 240. The ring gear member 224 and therefore output shaft 19 are rotated at a speed determined by the speed of the planet carrier assembly member 226, the speed of the sun gear member 222, and the ring gear/sun gear tooth ratio of the planetary gearset 220. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 250, 254, 258, and 260. During the sixth forward speed ratio, the planet carrier assembly member 226 is driven by the input shaft 17 and the sun gear member 222 is held stationary through the combination of engagements of the torque-transmitting mechanisms 254, 258, and 260. The ring gear member 224 and therefore output shaft 19 are rotated at a speed determined by the speed of the planet carrier assembly member 226 and the ring gear/sun gear tooth ratio of the planetary gearset 220. The numerical value of the sixth forward speed ratio is determined by the ring gear/sun gear tooth ratio of the planetary gearset 220.

The seventh forward speed ratio is established with the engagement of the torque-transmitting mechanisms 250, 252, 258, and 260. During the seventh forward speed ratio, the planet carrier assembly member 226 and sun gear member 232 are rotated at the speed of the input shaft 17, and the planet carrier assembly member 236 is held stationary by the torque-transmitting mechanism 258. The ring gear member 234 and sun gear member 222 are rotated at a speed determined by the speed of the sun gear member 232 and the ring gear/sun gear tooth ratio of the planetary gearset 230. The ring gear member 224 and therefore output shaft 19 are rotated at a speed determined by the speed of the planet carrier assembly member 226, the speed of the sun gear member 222, and the ring gear/sun gear tooth ratio of the planetary gearset 220. The numerical value of the seventh forward speed ratio is determined by the ring gear/sun gear tooth ratios of the planetary gearsets 220 and 230.

Figures 7, 8:
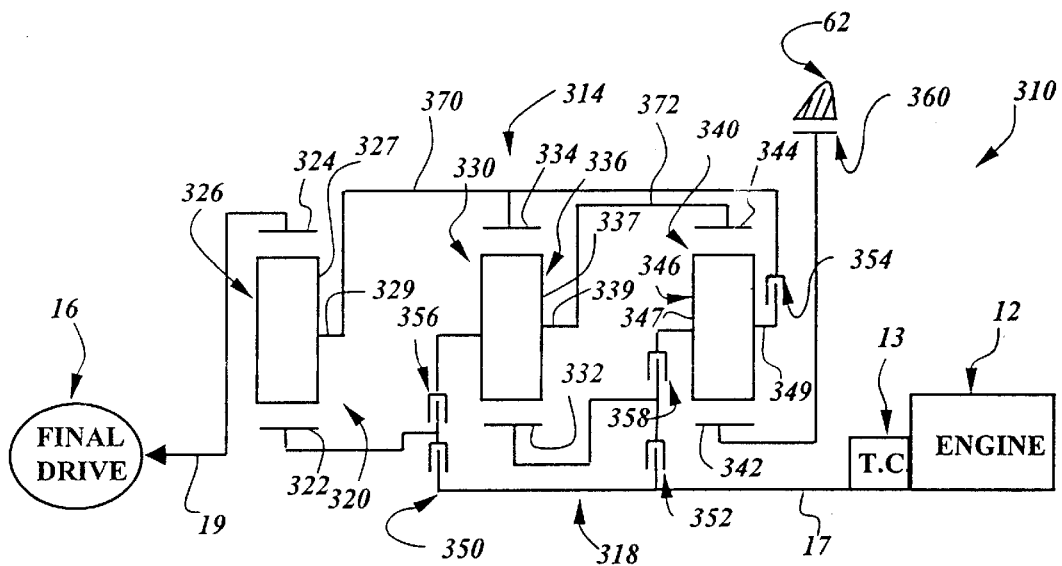
FIG. 7 is a schematic representation of a power transmission incorporating another embodiment of the present invention.
FIG. 8 is a truth table and chart describing the shift sequence and an example of the numerical values available for the embodiment shown in FIG. 7.

A powertrain 310 shown in FIG. 7 includes the engine 12, torque converter 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340 and six torque-transmitting mechanisms 350, 352, 354, 356, 358, and 360. The torque-transmitting mechanisms 350, 352, 354, 356 and 358 are rotating type torque-transmitting mechanisms, and the torque-transmitting mechanism 360 is a stationary type torque-transmitting mechanism.

The planetary gearset 320 includes a sun gear member 322, a ring gear member 324, and a planet carrier assembly member 326. The planet carrier assembly member 326 includes a plurality of pinion gears 327 which are rotatably mounted on planet carrier member 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 that are rotatably mounted on a planet carrier member 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 that are rotatably mounted on a planet carrier member 349 and disposed in meshing relationship with both the sun gear member 342 and the ring gear member 344.

The planet carrier assembly member 326 is continuously interconnected with the ring gear member 334 through an interconnecting member 370, which is selectively connectible with the planet carrier assembly member 346 through the torque-transmitting mechanism 354. The planet carrier assembly member 336 and ring gear member 344 are continuously interconnected by an interconnecting member 372, which is selectively connectible with the sun gear member 322 through the torque-transmitting mechanism 356.

The input shaft 17 is selectively connectible with the sun gear member 322 through the torque-transmitting mechanism 350 and selectively connectible with the sun gear member 332 through the torque-transmitting mechanism 352. The sun gear member 342 is selectively connectible with the transmission housing 62 through the torque-transmitting mechanism 360. The ring gear member 324 is continuously connected with the output shaft 19.

The truth table and chart of FIG. 8 represent the engagement combinations for the torque-transmitting mechanisms such that the planetary gear arrangement 318 will provide a reverse speed ratio and seven forward speed ratios between the input shaft 17 and the output shaft 19. The truth table also describes an example of the numerical values of the ratios that are available in the planetary gear arrangement 318 when the ring gear/sun gear tooth ratios of the planetary gearsets 320, 330, and 340 are equal to those given as R1/S1, R2/S2, and R3/S3, respectively. The chart of FIG. 8 provides a numerical example of the ratio steps between adjacent forward speed ratios as well as between the reverse and first forward speed ratio when the numerical speed ratios given in the truth table are employed. The chart of FIG. 8 also provides a numerical example of the overall ratio spread for the forward speed ratios.

The reverse speed ratio is established with the engagement of the torque-transmitting mechanisms 350, 354, 358, and 360. During the reverse speed ratio, the ring gear member 324 and therefore output shaft 19 are rotated at a speed determined by the speed of the sun gear member 322 and the ring gear/sun gear tooth ratio of the planetary gearset 320. The numerical value of the reverse speed ratio is determined by the ring gear/sun gear tooth ratio of the planetary gearset 320.

The first forward speed ratio is established with the engagement of the torque-transmitting mechanisms 350, 352, 354, and 360. During the first forward speed ratio, the planet carrier assembly member 336 and ring gear member 344 are rotated at a speed determined by the speed of the sun gear member 332, the speed of the ring gear member 334, and the ring gear/sun gear tooth ratio of the planetary gearset 330. The planet carrier assembly member 346, ring gear member 334, and planet carrier assembly member 326 are rotated at a speed determined by the speed of the ring gear member 344 and the ring gear/sun gear tooth ratio of the planetary gearset 340. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the first forward speed ratio is determined by the ring gear/sun gear tooth ratios of all three planetary gearsets 320, 330, and 340.

The second forward speed ratio is established with the engagement of the torque-transmitting mechanisms 352, 354, 356, and 360. During the second forward speed ratio, the planet carrier assembly member 336, sun gear member 322, and ring gear member 344 are rotated at a speed determined by the speed of the sun gear member 332, the speed of the ring gear member 334, and the ring gear/sun gear tooth ratio of the planetary gearset 330. The planet carrier assembly member 346, ring gear member 334, and planet carrier assembly member 326 are rotated at a speed determined by the speed of the ring gear member 344 and the ring gear/sun gear tooth ratio of the planetary gearset 340. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the second forward speed ratio is determined by all three planetary gearsets 320, 330, and 340.

The third forward speed ratio is established with the engagement of the torque-transmitting mechanisms 350, 354, 356, and 360. During the third forward speed ratio, the planet carrier assembly member 346 and planet carrier assembly member 326 are rotated at a speed determined by the speed of the ring gear member 344 (input) and the ring gear/sun gear tooth ratio of the planetary gearset 340. The ring gear member 324 and therefore output shaft 19 are rotated at a speed determined by the speed of the sun gear member 322, the speed of planet carrier assembly member 326, and the ring gear/sun gear tooth ratio of the planetary gearset 320. The numerical value of the third forward speed ratio is determined by the ring gear/sun gear tooth ratios of the planetary gearsets 320 and 340.

The fourth forward speed ratio is established with the engagement of the torque-transmitting mechanisms 350, 354, 356, and 358. During the fourth forward speed ratio, the sun gear member 322, the planetary gearset 330, and the planet carrier assembly member 326, and therefore the ring gear member 324, all rotate in unison with the input shaft 17. The numerical value of the fourth forward speed ratio is one.

The fifth forward speed ratio is established with the engagement of the torque-transmitting mechanisms 350, 356, 358, and 360. During the fifth forward speed ratio, the planet carrier assembly member 346 and sun gear member 332 are rotated at a speed determined by the speed of the ring gear member 344 (input) and the ring gear/sun gear tooth ratio of the planetary gearset 340. The ring gear member 334 and planet carrier assembly member 326 are rotated at a speed determined by the speed of the sun gear member 332, the speed of the planet carrier assembly member 336, and the ring gear/sun gear tooth ratio of the planetary gearset 330. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the fifth forward speed ratio is determined by the ring gear/sun gear tooth ratios of the all three planetary gearsets 320, 330, and 340.

The sixth forward speed ratio is established with the engagement of the torque-transmitting mechanisms 352, 356, 358, and 360. During the sixth forward speed ratio, the ring gear member 344, planet carrier assembly member 336, and sun gear member 322 are rotated at a speed determined by the speed of the planet carrier assembly member 346 (input) and the ring gear/sun gear tooth ratio of the planetary gearset 340. The ring gear member 334 and planet carrier assembly member 326 are rotated at a speed determined by the speed of the sun gear member 332, the speed of the planet carrier assembly member 336, and the ring gear/sun gear tooth ratio of the planetary gearset 330. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the sixth forward speed ratio is determined by the ring gear/sun gear tooth ratios of all three planetary gearsets 320, 330, and 340.

The seventh forward speed ratio is established with the engagement of the torque-transmitting mechanisms 350, 352, 358, and 360. During the seventh forward speed ratio, the ring gear member 344 and planet carrier assembly member 336 are rotated at a speed determined by the speed of the planet carrier assembly member 346 and the ring gear/sun gear tooth ratio of the planetary gearset 340. The ring gear member 334 and planet carrier assembly member 326 are rotated at a speed determined by the speed of the sun gear member 332, the speed of the planet carrier assembly member 336, and the ring gear/sun gear tooth ratio of the planetary gearset 330. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the seventh forward speed ratio is determined by the ring gear/sun gear tooth ratios of all three planetary gearsets 320, 330, and 340.

Figures 9, 10:
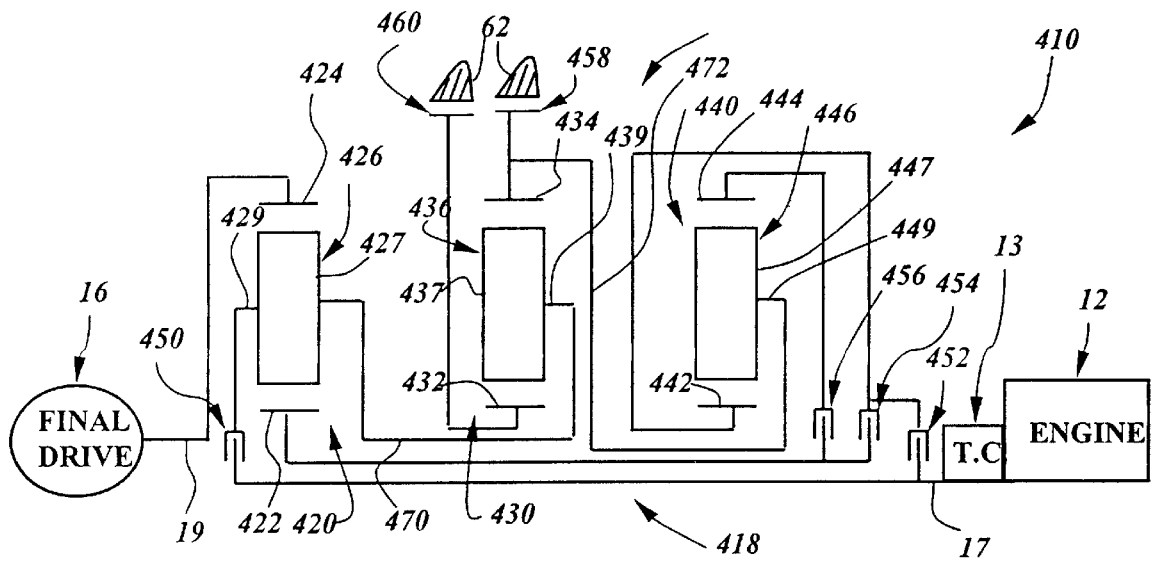
FIG. 9 is a schematic representation of a power transmission incorporating another embodiment of the present invention.
FIG. 10 is a truth table and chart describing the shift sequence and an example of the numerical values available for the embodiment shown in FIG. 9.

A powertrain 410 shown in FIG. 9 includes the engine 12, torque converter 13, a planetary transmission 414, and the fmal drive mechanism 16. The planetary transmission 414 includes the input shaft 17, a planetary gear arrangement 418, and the output shaft 19. The planetary gear arrangement 418 includes three planetary gearsets 420, 430, and 440 and six torque-transmitting mechanisms 450, 452, 454, 456, 458, and 460. The torque-transmitting mechanisms 450, 452, 454, and 456 are rotating type torque-transmitting mechanisms, and the torque-transmitting mechanisms 458 and 460 are stationary type torque-transmitting mechanisms.

The planetary gearset 420 includes a sun gear member 422, a ring gear member 424, and a planet carrier assembly member 426. The planet carrier assembly member 426 includes a plurality of pinion gears 427 which are rotatably mounted on planet carrier member 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 that are rotatably mounted on a planet carrier member 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 that are rotatably mounted on a planet carrier member 449 and disposed in meshing relationship with both the sun gear member 442 and the ring gear member 444.

The planet carrier assembly member 426 is continuously interconnected with the planet carrier assembly member 436 through an interconnecting member 470. The ring gear member 434 and the planet carrier assembly member 446 are continuously interconnected through an interconnecting member 472. The output shaft 19 is continuously connected with the ring gear member 424.

The input shaft 17 is selectively connectible with the interconnecting member 470 through the torque-transmitting mechanism 450 and selectively connectible with the sun gear member 442 through the torque-transmitting mechanism 452. The sun gear member 422 and the sun gear member 442 are selectively interconnectible through the torque-transmitting mechanism 454. The sun gear member 422 and the ring gear member 444 are selectively interconnectable through the torque-transmitting mechanism 456. The interconnecting member 472 is selectively connectible to the transmission housing 62 through the torque-transmitting mechanism 458. The sun gear member 432 is selectively connectible with the transmission housing 62 through the torque-transmitting mechanism 460.

The truth table and chart of FIG. 10 describes the engagement combinations for the torque-transmitting mechanisms in order that a reverse speed ratio and seven forward speed ratios are provided in the planetary gear arrangement 418 between the input shaft 17 and the output shaft 19. The truth table of FIG. 10 also provides a numerical example of speed ratios that are available with the family member shown in FIG. 9 when the ring gear/sun gear tooth ratios of the planetary gearsets 420, 430, and 440 are utilized as represented by the ring gear/sun gear tooth ratios R1/S1, R2/S2, and R3/S3, respectively. Also in FIG. 10 is a chart, which depicts the ratio steps between adjacent forward speed ratios as well as between the reverse and first forward speed ratio when the numerical values of the truth table are employed. This chart also provides the numerical value of the overall ratio spread for the forward speed ratios.

The reverse speed ratio is established with the engagement of the torque-transmitting mechanisms 452, 454, 458, and 460. During the reverse speed ratio, the planet carrier assembly member 426 is held stationary. The ring gear member 424 and therefore output shaft 19 rotate at a speed determined by the speed of the sun gear member 422 and the ring gear/sun gear tooth ratio of the planetary gearset 420. The numerical value of the reverse speed ratio is determined by the ring gear/sun gear tooth ratio of the planetary gearset 420.

The first forward speed ratio is established with the engagement of the torque-transmitting mechanisms 452, 456, 458, and 460. During the first forward speed ratio, the ring gear member 444 and sun gear member 422 are rotated at a speed determined by the speed of the input shaft 17 and sun gear member 442, as well as the ring gear/sun gear tooth ratio of the planetary gearset 440. The ring gear member 424 and therefore output shaft 19 are rotated at a speed determined by the speed of the sun gear member 422 and the ring gear/sun gear tooth ratio of the planetary gearset 420. The numerical value of the first forward speed ratio is determined by the ring gear/sun gear tooth ratios of the planetary gearsets 420 and 440.

The second forward speed ratio is established with the engagement of the torque-transmitting mechanisms 452, 454, 456, and 460. During the second forward speed ratio, the ring gear member 434 is rotated at the speed of the input shaft 17. The planet carrier assembly member 436 and planet carrier assembly member 426 are rotated at a speed determined by the speed of the ring gear member 434 and the ring gear/sun gear tooth ratio of the planetary gearset 430. The ring gear member 424 and therefore output shaft 19 are rotated at a speed determined by the speed of the sun gear member 422, the speed of the planet carrier assembly member 426, and the ring gear/sun gear tooth ratio of the planetary gearset 420. The numerical value of the second forward speed ratio is determined by the ring gear/sun gear tooth ratios of the planetary gearsets 420 and 430.

The third forward speed ratio is established with the engagement of the torque-transmitting mechanisms 450, 452, 456, and 460. During the third forward speed ratio, the speed of the ring gear member 434 and planet carrier assembly member 446 are determined by the speed of planet carrier assembly member 436 and the ring gear/sun gear tooth ratio of the planetary gearset 430. The speed of the ring gear member 444 and sun gear member 422 are determined by the speed of the sun gear member 442, the speed of the planet carrier assembly member 446, and the ring gear/sun gear tooth ratio of the planetary gearset 440. The ring gear member 424 and therefore output shaft 19 are rotated at a speed determined by the speed of the planet carrier assembly member 426, the speed of the sun gear member 422 and the ring gear/sun gear tooth ratio of the planetary gearset 420. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 450, 454, 456, and 460. During the fourth forward speed ratio, the sun gear member 422, planetary gearset 440, and ring gear member 434 all rotate in unison. The planet carrier assembly member 436 and planet carrier assembly member 426 rotate at the speed of the input shaft 17. The ring gear member 434 is driven at a speed determined by the speed of the planet carrier assembly member 436 and the ring gear/sun gear tooth ratio of the planetary gearset 430. The ring gear member 424 and therefore output shaft 19 rotate at a speed determined by the speed of the sun gear member 422, the speed of the planet carrier assembly member 426, and the ring gear/sun gear tooth ratio of the planetary gearset 420. The numerical value of the fourth forward speed ratio is determined by the ring gear/sun gear tooth ratios of the planetary gearsets and 430.

The fifth forward speed ratio is established with the engagement of the torque-transmitting mechanisms 450, 452, 454, and 456. During the fifth forward speed ratio, the members of the planetary gearset 420 and therefore the output shaft 19 are driven in unison with the input shaft 17. The numerical value of the fifth forward speed ratio is therefore one.

The sixth forward speed ratio is established with the engagement of the torque-transmitting mechanisms 450, 454, 456, and 458. During the sixth forward speed ratio, the sun gear member 422 is held stationary. The speed of the ring gear member 424 and therefore output shaft 19 is determined by the speed of the planet carrier assembly member 426 and the ring gear/sun gear tooth ratio of the planetary gearset 420. The numerical value of the sixth forward speed ratio is determined by the ring gear/sun gear tooth ratio of the planetary gearset 420.

The seventh forward speed ratio is established with the engagement of the torque-transmitting mechanisms 450, 452, 456, and 458. During the seventh forward speed ratio the speed of the ring gear member 444 and sun gear member 422 are determined by the speed of the sun gear member 442 and the ring gear/sun gear tooth ratio of the planetary gearset 440. The speed of the ring gear member 424 and therefore output shaft 19 are determined by the speed of the planet carrier assembly member 426, the speed of the sun gear member 422, and the ring gear/sun gear tooth ratio of the planetary gearset 420. The numerical value of the seventh forward speed ratio is determined by the ring gear/sun gear tooth ratios of the planetary gearsets 420 and 440.

Figures 11, 12:
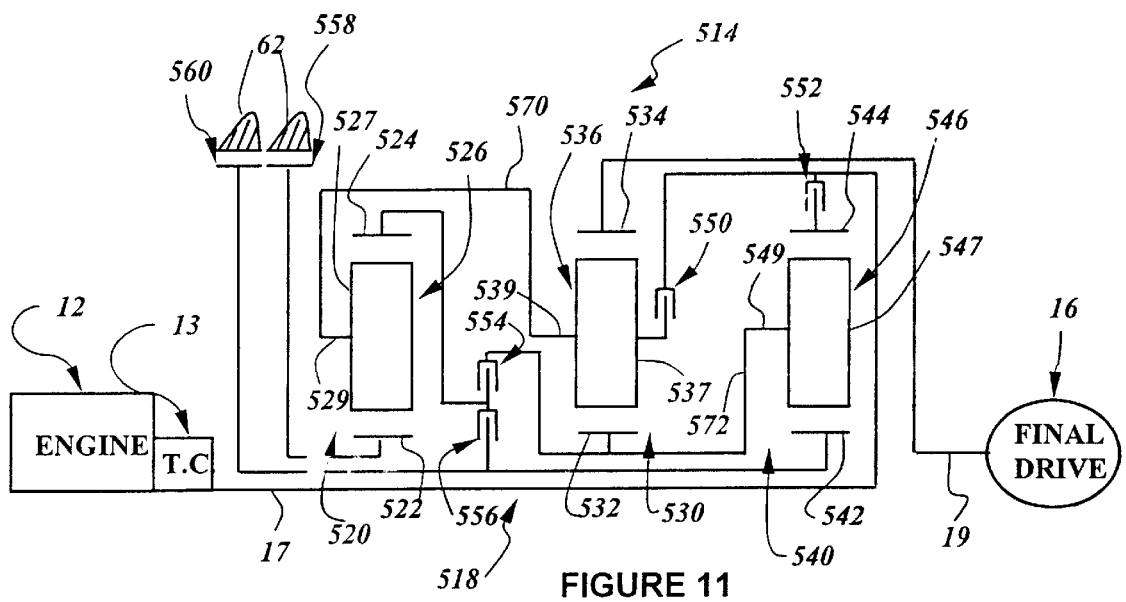
FIG. 11 is a schematic representation of a power transmission incorporating another embodiment of the present invention.
FIG. 12 is a truth table and chart describing the shift sequence and an example of the numerical values available for the embodiment shown in FIG. 11.

A powertrain 510 shown in FIG. 11 includes the engine 12, torque converter 13, a planetary transmission 514, and the fmal drive mechanism 16. The planetary transmission 514 includes the input shaft 17, a planetary gear arrangement 518, and the output shaft 19. The planetary gear arrangement 518 includes three planetary gearsets 520, 530, and 540 and six torque-transmitting mechanisms 550, 552, 554, 556, 558, and 560. The torque-transmitting mechanisms 550, 552, 554, and 556 are rotating type torque-transmitting mechanisms, and the torque-transmitting mechanisms 558 and 560 are stationary type torque-transmitting mechanisms.

The planetary gearset 520 includes a sun gear member 522, a ring gear member 524, and a planet carrier assembly member 526. The planet carrier assembly member 526 includes a plurality of pinion gears 527 which are rotatably mounted on planet carrier member 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 that are rotatably mounted on a planet carrier member 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 that are rotatably mounted on a planet carrier member 549 and disposed in meshing relationship with both the sun gear member 542 and the ring gear member 544.

The planet carrier assembly member 526 is continuously interconnected with planet carrier assembly member 536 through an interconnecting member 570. The sun gear member 532 is continuously interconnected with the planet carrier assembly member 546 through an interconnecting member 572.

The input shaft 17 is selectively connectible with the interconnecting member 570 through the torque-transmitting mechanism 550 and selectively connectible with the ring gear member 544 through the torque-transmitting mechanism 552. The ring gear member 524 is selectively connectible with the interconnecting member 572 through the torque-transmitting mechanism 554 and selectively connectible with the sun gear member 542 through the torque-transmitting mechanism 556. The sun gear member 522 is selectively connectible with the transmission housing 62 through the torque-transmitting mechanism 558. The sun gear member 542 is selectively connectible with the transmission housing 62 through torque-transmitting mechanism 560. The output shaft 19 is continuously connected with the ring gear member 534.

The truth table and chart shown in FIG. 12 provides the engagement combinations of the torque-transmitting mechanisms in order to establish a reverse speed ratio and seven forward speed ratios between the input shaft 17 and the output shaft 19 through the planetary gear arrangement 518. The truth table also provides an example of numerical values that are available for these ratios when the ring gear/sun gear tooth ratios of the planetary gearsets 520, 530, and 540 are as given in R1/S1, R2/S2, and R3/S3, respectively. Also provided in FIG. 12 is the chart of ratio steps giving the numerical value between adjacent forward speed ratios and between the reverse speed ratio and the first forward speed ratio when the numerical values of the ratios given in the truth table are employed. Also the chart of FIG. 12 provides the numerical value for the overall ratio spread of the forward speed ratios.

By reviewing the engagement schedule shown in the truth table in FIG. 12, those skilled in the art will recognize that the reverse speed ratio has a numerical value determined by the ring gear/sun gear tooth ratios of the planetary gearsets 530 and 540. The first forward speed ratio has a numerical value determined by the ring gear/sun gear tooth ratios of all three planetary gearsets 520, 530, and 540. The second and third forward speed ratios have numerical values determined by the ring gear/sun gear tooth ratios of the planetary gearsets 520 and 530. The fourth forward speed ratio has a numerical value determined by the ring gear/sun gear tooth ratios of all three planetary gearsets 520, 530, and 540. The fifth forward speed ratio has a numerical value of one. The sixth forward speed ratio has a numerical value determined by the ring gear/sun gear tooth ratios of the planetary gearsets 530 and 540. The seventh forward speed ratio has numerical value determined by the ring gear/sun gear tooth ratio of the planetary gearset 530.

Figures 13, 14:
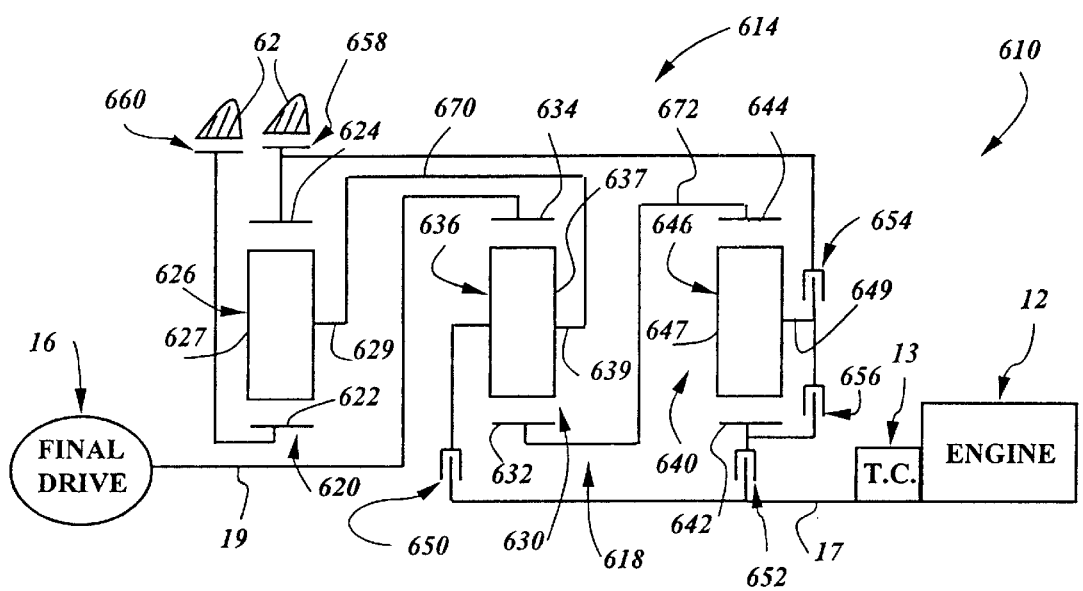
FIG. 13 is a schematic representation of a power transmission incorporating another embodiment of the present invention.
FIG. 14 is a truth table and chart describing the shift sequence and an example of the numerical values available for the embodiment shown in FIG. 13.

A powertrain 610 shown in FIG. 13 includes the engine 12, torque converter 13, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640 and six torque-transmitting mechanisms 650, 652, 654, 656, 658, and 660. The torque-transmitting mechanisms 650, 652, 654, and 656 are rotating type torque-transmitting mechanisms, and the torque-transmitting mechanisms 658 and 660 are stationary type torque-transmitting mechanisms.

The planetary gearset 620 includes a sun gear member 622, a ring gear member 624, and a planet carrier assembly member 626. The planet carrier assembly member 626 includes a plurality of pinion gears 627 which are rotatably mounted on planet carrier member 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 that are rotatably mounted on a planet carrier member 639 and disposed in meshing relationship with both the sun gear member 632 and the ring gear ember 634.

The planetary gearset 640 includes a sun gear member 642, a ring gear member 644, and a planet carrier assembly member 646. The planet carrier assembly member 646 includes a plurality of pinion gears 647 that are rotatably mounted on a planet carrier member 649 and disposed in meshing relationship with both the sun gear member 642 and the ring gear member 644.

The planet carrier assembly member 626 is continuously interconnected with the planet carrier assembly member 636 through an interconnecting member 670. The sun gear member 632 and ring gear member 644 are continuously interconnected by an interconnecting member 672.

The input shaft 17 is selectively connectible with the interconnecting member 670 through the torque-transmitting mechanism 650 and selectively connectible with the sun gear member 642 through the torque-transmitting mechanism 652. The planet carrier assembly member 646 is selectively connectible with the ring gear member 624 through the torque-transmitting mechanism 654 and selectively connectible with the sun gear member 642 through the torque-transmitting mechanism 656. The ring gear member 624 is selectively connectible with the transmission housing 62 through the torque-transmitting mechanism 658. The sun gear member 622 is selectively connectible with the transmission housing 62 through the torque-transmitting mechanism 660. The input shaft 19 is continuously connectible with the ring gear member 634.

The truth table and chart shown in FIG. 14 provides the combinations of engagements for the establishment of the reverse speed ratio and the seven forward speed ratios of the planetary gear arrangement 618 between the input shaft 17 and the output shaft 19. Also provided in the truth table is a numerical example for each of the speed ratios and the ring gear/sun gear tooth ratios of the planetary gearsets 620, 630, and 640 are as described in R1/S1, R2/S2, and R3/S3, respectively. Also provided in FIG. 14 is the chart of ratio steps between adjacent forward speed ratios as well as between the reverse speed ratio and the first forward speed ratio. Further information given in the chart is the overall ratio spread of the forward speed ratios.

When reviewing the truth table, those skilled in the art will recognize that the reverse speed ratio has a numerical value determined by the ring gear/sun gear tooth ratio of the planetary gearset 630. The first and seventh forward speed ratios have numerical values determined by the ring gear/sun gear tooth ratios of the planetary gearsets 630 and 640. The second and fourth forward speed ratios have numerical values determined by the ring gear/sun gear tooth ratios of the planetary gearsets 620 and 630. The third forward speed ratio has a numerical value determined by the ring gear/sun gear tooth ratios of all three planetary gearsets 620, 630, and 640. The fifth forward speed ratio has a numerical value of one. The sixth forward speed ratio has a numerical value determined by the ring gear/sun gear tooth ratio of the planetary gearset 630.

Figures 15, 16:
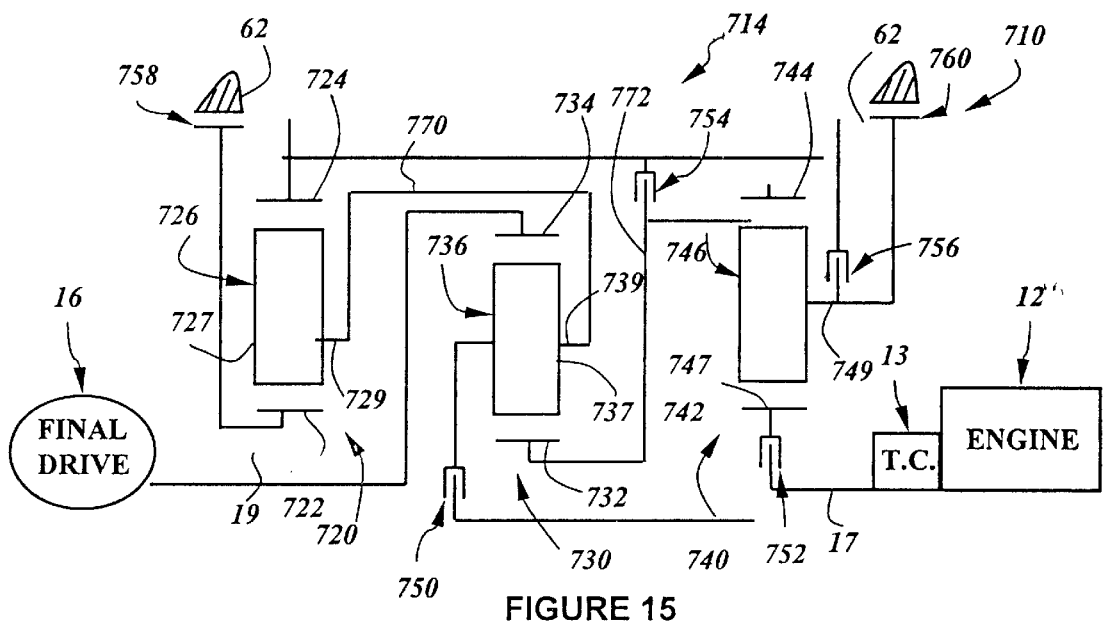
FIG. 15 is a schematic representation of a power transmission incorporating another embodiment of the present invention.
FIG. 16 is a truth table and chart describing the shift sequence and an example of the numerical values available for the embodiment shown in FIG. 15.

A powertrain 710 shown in FIG. 15 includes the engine 12, torque converter 13, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740 and six torque-transmitting mechanisms 750, 752, 754, 756, 758, and 760. The torque-transmitting mechanisms 750, 752, 754, and 756 are rotating type torque-transmitting mechanisms, and the torque-transmitting mechanisms 758 and 760 are stationary type torque-transmitting mechanisms.

The planetary gearset 720 includes a sun gear member 722, a ring gear member 724, and a planet carrier assembly member 726. The planet carrier assembly member 726 includes a plurality of pinion gears 727 which are rotatably mounted on planet carrier member 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 that are rotatably mounted on a planet carrier member 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 that are rotatably mounted on a planet carrier member 749 and disposed in meshing relationship with both the sun gear member 742 and the ring gear member 744.

FIG. 16 provides a truth table and chart which give a pictorial representation of the engagement combinations for the torque-transmitting mechanisms in order to provide a reverse speed ratio and seven forward speed ratios in the planetary gear arrangement 718 between the input shaft 17 and the output shaft 19. The truth table also provides a numerical example of speed ratios that are available with the planetary gear arrangement 718 when the ring gear/sun gear tooth ratios of the planetary gearsets 720, 730, and 740 are established as shown in the ratios R1/S1, R2/S2, and R3/S3, respectively. Further information provided in FIG. 16 is the numerical values for the ratio steps between adjacent forward speed ratios and between the reverse speed ratio and the first forward speed ratio when the given speed ratios of the truth table are employed. Also provided in the chart is the numerical value for the overall ratio spread of the forward speed ratios.

On reviewing the truth table of FIG. 16, those skilled in the art will recognize that the numerical values for the reverse speed ratio and the third forward speed ratio are determined by the ring gear/sun gear tooth ratios of the planetary gearsets 720, 730, and 740. The numerical values for he first forward speed ratio and the seventh forward speed ratio are determined by the ring gear/sun gear tooth ratios of the planetary gearsets 730 and 740. The numerical values for the second forward speed ratio and the fourth forward speed ratio are determined by the ring gear/sun gear tooth ratios of the planetary gearsets 720 and 730. The numerical value of fifth forward speed ratio is one. The numerical of the sixth forward speed ratio is determined by the ring gear/sun gear tooth ratio of the planetary gearset 730.

As with all the previous family members, it should be appreciated that the reuse of the planetary gearsets and various speed ratios is possible through the combinations of torque-transmitting mechanism engagements which are available.

Figures 17, 18:
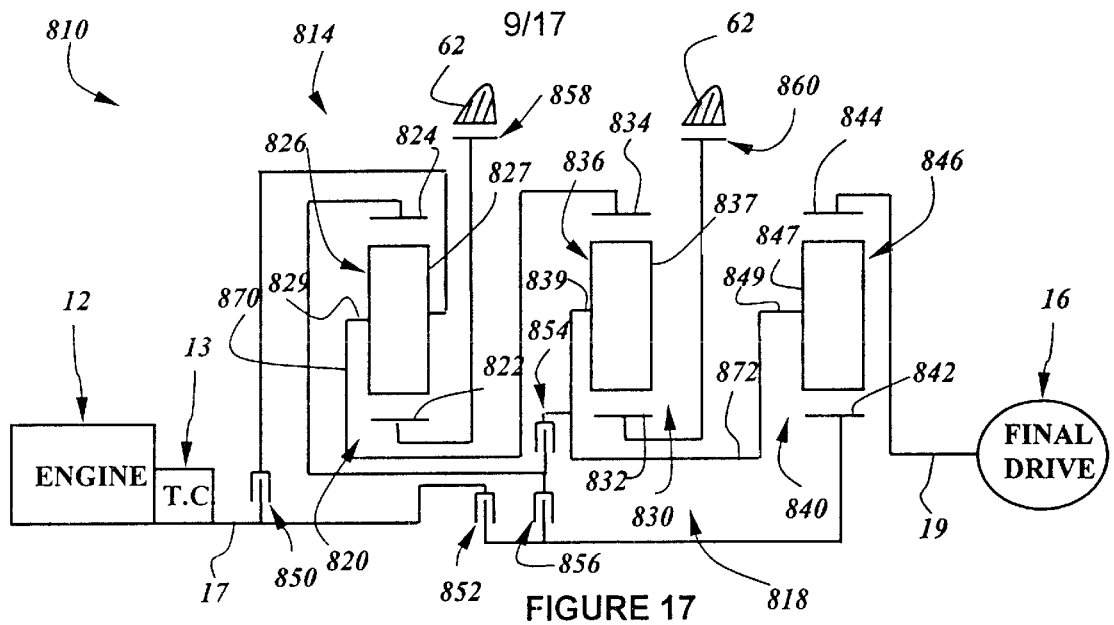
FIG. 17 is a schematic representation of a power transmission incorporating another embodiment of the present invention.
FIG. 18 is a truth table and chart describing the shift sequence and an example of the numerical values available for the embodiment shown in FIG. 17.

A powertrain 810 shown in FIG. 17 includes the engine 12, torque converter 13, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840 and six torque-transmitting mechanisms 850, 852, 854, 856, 858, and 860. The torque-transmitting mechanisms 850, 852, 854, and 856 are rotating type torque-transmitting mechanisms, and the torque-transmitting mechanisms 858 and 860 are stationary type torque-transmitting mechanisms.

The planetary gearset 820 includes a sun gear member 822, a ring gear member 824, and a planet carrier assembly member 826. The planet carrier assembly member 826 includes a plurality of pinion gears 827 which are rotatably mounted on planet carrier member 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 that are rotatably mounted on a planet carrier member 839 and disposed in meshing relationship with both the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 that are rotatably mounted on a planet carrier member 849 and disposed in meshing relationship with both the sun gear member 842 and the ring gear member 844.

The planet carrier assembly member 826 is continuously interconnected with the ring gear member 834 through an interconnecting member 870. The planet carrier assembly members 836 and 846 are continuously interconnected by an interconnecting member 872. The ring gear member 844 is continuously connected with the output shaft 19.

The input shaft 17 is selectively connectible with the interconnecting member 870 through the torque-transmitting mechanism 850 and selectively connectible with the sun gear member 842 through the torque-transmitting mechanism 852. The ring gear member 824 is selectively interconnectible with the interconnecting member 872 through the torque-transmitting mechanism 854 and selectively connectible with the sun gear member 842 through the torque-transmitting mechanism 856. The sun gear member 822 is selectively connectible with the transmission housing 62 through the torque-transmitting mechanism 858. The sun gear member 832 is selectively connectible with the transmission housing 62 through the torque-transmitting mechanism 860.

The truth table of FIG. 18 provides a pictorial representation of the combinations of engagements of the torque-transmitting mechanisms in order to provide the reverse speed ratio and seven forward speed ratios in the planetary gear arrangement 818. Also provided in the truth table is a numerical example for the available speed ratios when the ring gear/sun gear tooth ratios of the planetary gearsets 820, 830, and 840 are provided as represented as R1/S1, R2/S2, and R3/S3, respectively. Also given in FIG. 18 is a chart of the numerical values of the ratio steps between adjacent forward speed ratios and between the reverse speed ratio and the first forward speed ratio when the given speed ratios of the truth table are employed. The chart further provides a numerical value for the overall ratio spread of the forward speed ratios.

Those skilled in the art, upon reviewing the truth table and the engagement combinations provided therein, will recognize that the reverse speed ratio has a numerical value determined by the ring gear/sun gear tooth ratio of the planetary gearset 840. The first and second forward speed ratios have numerical values determined by the ring gear/sun gear tooth ratios of all three planetary gearsets 820, 830, and 840. The third forward speed ratio has a numerical value determined by the ring gear/sun gear tooth ratios of the planetary gearsets 830 and 840. The fourth forward speed ratio has a numerical value determined by the ring gear/sun gear tooth ratio of the planetary gearset 830. The fifth forward speed ratio has a numerical value of one. The sixth forward speed ratio has a numerical value determined by the ring gear/sun gear tooth ratio of the planetary gearset 820. The seventh forward speed ratio has a numerical value determined by the ring gear/sun gear tooth ratios of the planetary gearsets 820 and 840.

Figures 19, 20:
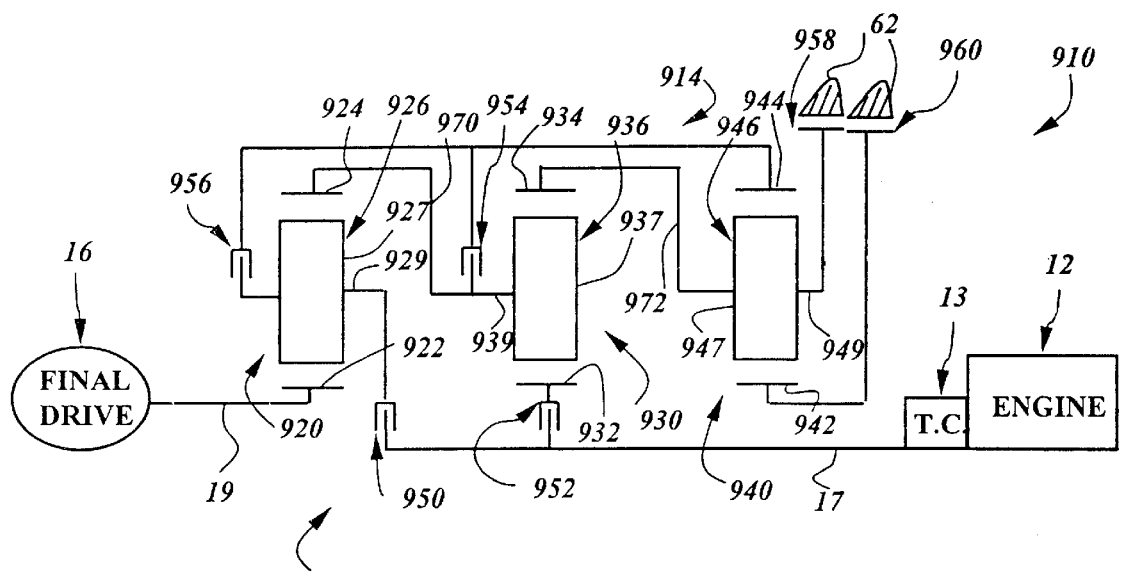
FIG. 19 is a schematic representation of a power transmission incorporating another embodiment of the present invention.
FIG. 20 is a truth table and chart describing the shift sequence and an example of the numerical values available for the embodiment shown in FIG. 19.

A powertrain 910 shown in FIG. 19 includes the engine 12, torque converter 13, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940 and six torque-transmitting mechanisms 950, 952, 954, 956, 958, and 960. The torque-transmitting mechanisms 950, 952, 954, and 956 are rotating type torque-transmitting mechanisms, and the torque-transmitting mechanisms 958 and 960 are stationary type torque-transmitting mechanisms.

The planetary gearset 920 includes a sun gear member 922, a ring gear member 924, and a planet carrier assembly member 926. The planet carrier assembly member 926 includes a plurality of pinion gears 927 which are rotatably mounted on planet carrier member 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pinion gears 937 that are rotatably mounted on a planet carrier member 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 that are rotatably mounted on a planet carrier member 949 and disposed in meshing relationship with both the sun gear member 942 and the ring gear member 944.

The ring gear member 924 is continuously interconnected with the planet carrier assembly member 936 through an interconnecting member 970. The ring gear member 934 is continuously interconnected with the planet carrier assembly member 946 through an interconnecting member 972. The output shaft 19 is continuously connected with the sun gear member 922.

The input shaft 17 is selectively connectible with the planet carrier assembly member 926 through the torque-transmitting mechanism 950 and selectively connectible with the sun gear member 932 through the torque-transmitting mechanism 952. The ring gear member 944 is selectively connectible with the interconnecting member 970 through the torque-transmitting mechanism 954 and selectively connectible with the planet carrier assembly member 926 through the torque-transmitting mechanism 956. The interconnecting member 972 is selectively connectible with the transmission housing 62 through the torque-transmitting mechanism 958. The sun gear member 942 is selectively connectible with the transmission housing 62 through the torque-transmitting mechanism 960.

The truth table and chart shown in FIG. 20 provide a pictorial representation of the engagement combinations and sequences for the torque-transmitting mechanisms in order to establish a reverse speed ratio and seven forward speed ratios between the input shaft 17 and the output shaft 19 through the planetary gear arrangement 918. The truth table also provides a numerical example for the speed ratios given therein. These numerical examples are established utilizing the ring gear/sun gear tooth ratios given as R1/S1, R2/S2, and R3/S3, which represent the planetary gearsets 920, 930, and 940, respectively. The chart in FIG. 20 provides a numerical example of the ratio steps between adjacent forward speed ratios and between the reverse speed ratio and the first forward speed ratio when the numerical speed ratios of the truth table are employed. The chart of FIG. 20 also provides the numerical example of the overall ratio spread of the forward speed ratios.

On reviewing the truth table and the engagement combinations found therein, those skilled in the art will recognize that the reverse speed ratio and the sixth forward speed ratio have numerical values determined by the ring gear/sun gear tooth ratios of the planetary gearsets 920 and 930. The first forward speed ratio has a numerical value determined by the ring gear/sun gear tooth ratio of the planetary gearset 930. The second forward speed ratio has a numerical value determined by the ring gear/sun gear tooth ratios of the planetary gearsets 930 and 940. The third forward speed ratio has a numerical value of one. The fourth and fifth forward speed ratios have numerical values determined by the ring gear/sun gear tooth ratios of all three planetary gearsets 920, 930, and 940. The seventh forward speed ratio has a numerical value determined by the ring gear/sun gear tooth ratio of the planetary gearset 920.

Figures 21, 22:
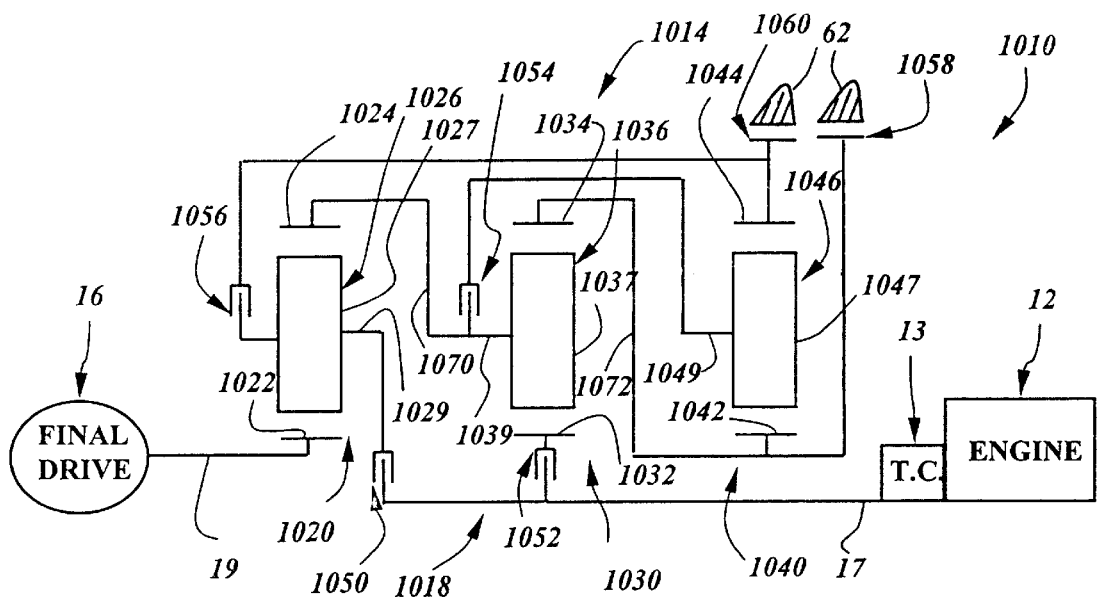
FIG. 21 is a schematic representation of a power transmission incorporating another embodiment of the present invention.
FIG. 22 is a truth table and chart describing the shift sequence and an example of the numerical values available for the embodiment shown in FIG.21.

A powertrain 1010 shown in FIG. 21 includes the engine 12, torque converter 13, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040 and six torque-transmitting mechanisms 1050, 1052, 1054, 1056, 1058, and 1060. The torque-transmitting mechanisms 1050, 1052, 1054, and 1056 are rotating type torque-transmitting mechanisms, and the torque-transmitting mechanisms 1058 and 1060 are stationary type torque-transmitting mechanisms.

The planetary gearset 1020 includes a sun gear member 1022, a ring gear member 1024, and a planet carrier assembly member 1026. The planet carrier assembly member 1026 includes a plurality of pinion gears 1027 which are rotatably mounted on planet carrier member 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 that are rotatably mounted on a planet carrier member 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 that are rotatably mounted on a planet carrier member 1049 and disposed in meshing relationship with both the sun gear member 1042 and the ring gear member 1044.

The ring gear member 1024 is continuously connected with the planet carrier assembly member 1036 through an interconnecting member 1070. The ring gear member 1034 is continuously interconnected with the sun gear member 1042 through an interconnecting member 1072. The sun gear member 1022 is continuously connected with the output shaft 19.

The input shaft 17 is selectively connectible with the planet carrier assembly member 1026 through the torque-transmitting mechanism 1050 and selectively connectible with the sun gear member 1032 through the torque-transmitting mechanism 1052. The interconnecting member 1070 is selectively connectible with the planet carrier assembly member 1046 through the torque-transmitting mechanism 1054. The ring gear member 1044 is selectively connectible with the planet carrier assembly member 1026 through the torque-transmitting mechanism 1056 and selectively connectible with the transmission housing 62 through the torque-transmitting mechanism 1060. The interconnecting member 1072 is selectively connectible with the transmission housing 62 through the torque-transmitting mechanism 1058.

The truth table shown in FIG. 22 provides a pictorial representation of the engagement sequence and combinations for the torque-transmitting mechanisms in order to establish a reverse speed ratio and seven forward speed ratios through the planetary gear arrangement 1018 between the input shaft 17 and the output shaft 19. The truth table also provides an example of numerical values of the speed ratios that are available in the planetary gear arrangement 1018. These numerical values are determined utilizing the ring gear/sun gear tooth ratios given as R1/S1, R2/S2, and R3/S3. These values represent the ring gear/sun gear tooth ratios of the planetary gearsets 1020, 1030, and 1040, respectively. Also given in FIG. 22 is a chart of the numerical values of the ratio steps between adjacent forward speed ratios as well between the reverse speed ratio and the first forward speed ratio. The chart also provides the numerical value for the overall ratio spread in the forward speed ratios.

Those skilled in the art will, upon reviewing the truth table, recognize that the numerical value of the reverse speed ratio is determined by the ring gear/sun gear tooth ratios of the planetary gearsets 1020 and 1030. The numerical values of the first forward speed ratio, the second forward speed ratio, and the seventh forward speed ratio are determined utilizing the ring gear/sun gear tooth ratios of all three planetary gearsets 1020, 1030, and 1040. The third forward speed ratio has a numerical value of one. The numerical value of the fourth forward speed ratio is determined utilizing the ring gear/sun gear tooth ratios of the planetary gearsets 1020 and 1040. The numerical value of the fifth forward speed ratio is determined by the ring gear/sun gear tooth ratios of the planetary gearsets 1020 and 1030. The numerical value of the sixth forward speed ratio is determined by the ring gear/sun gear tooth ratio of the planetary gearset 1020.

Figures 23, 24:
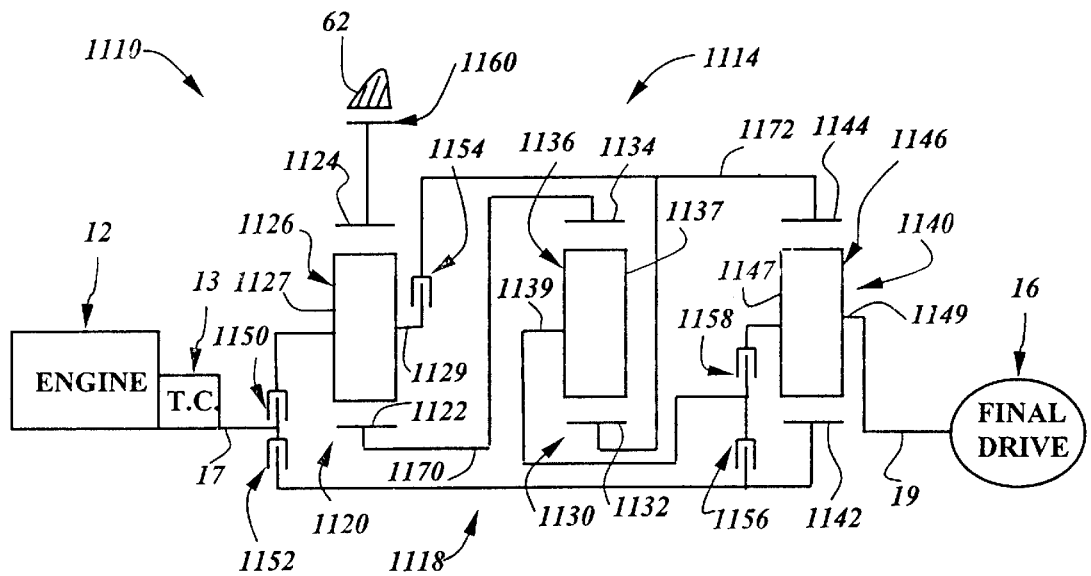
FIG. 23 is a schematic representation of a power transmission incorporating another embodiment of the present invention.
FIG. 24 is a truth table and chart describing the shift sequence and an example of the numerical values available for the embodiment shown in FIG.23.

A powertrain 1110 shown in FIG. 23 includes the engine 12, torque converter 13, a planetary transmission 1114, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140 and six torque-transmitting mechanisms 1150, 1152, 1154, 1156, 1158, and 1160. The torque-transmitting mechanisms 1150, 1152, 1154, 1156 and 1158 are rotating type torque-transmitting mechanisms, and the torque-transmitting mechanism 1160 is a stationary type torque-transmitting mechanism.

The planetary gearset 1120 includes a sun gear member 1122, a ring gear member 1124, and a planet carrier assembly member 1126. The planet carrier assembly member 1126 includes a plurality of pinion gears 1127 which are rotatably mounted on planet carrier member 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gears 1137 that are rotatably mounted on a planet carrier member 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 that are rotatably mounted on a planet carrier member 1149 and disposed in meshing relationship with both the sun gear member 1142 and the ring gear member 1144.

The sun gear member 1122 is continuously connected with the ring gear member 1134 through an interconnecting member 1170. The sun gear member 1132 is continuously interconnected with the ring gear member 1144 through an interconnecting member 1172, which is selectively connectible with the planet carrier assembly member 1126 through the torque-transmitting mechanism 1154. The planet carrier assembly member 1146 is continuously connected with the output shaft 19 and is selectively connectible with the planet carrier assembly member 1136 through the torque-transmitting mechanism 1158.

The input shaft 17 is selectively connectible with the planet carrier assembly member 1126 through the torque-transmitting mechanism 1150 and selectively connectible with the sun gear member 1142 through the torque-transmitting mechanism 1152. The sun gear member 1142 is selectively connectively connectible with the planet carrier assembly member 1136 through the torque-transmitting mechanism 1156. The ring gear member 1124 is selectively connectible with the transmission housing 62 through the torque-transmitting mechanism 1160.

The truth table shown in FIG. 24 provides a pictorial representation of the engagement sequence and combinations for the torque-transmitting mechanisms in order to establish a reverse speed ratio and seven forward speed ratios in the planetary gear arrangement 1118 between the input shaft 17 and the output shaft 19. The truth table also provides an example of numerical values, which can be attained with the planetary gear arrangement 1118 when the ring gear/sun gear tooth ratios of the planetary gearsets 1120, 1130, and 1140 are as shown in FIG. 24 as R1/S1, R2/S2, and R3/S3, respectively. The chart of FIG. 24 provides the numerical values for the ratio steps between adjacent forward speed ratios as well as between the reverse speed ratio and the first forward speed ratio. This chart also provides the overall ratio spread for the forward speed ratios.

Those skilled in the art, upon reviewing the combinations of engagements and the ring gear/sun gear tooth ratios, will be able to ascertain the numerical values given. The numerical values for the reverse speed ratio, the first forward speed ratio, the second forward speed ratio, the fourth forward speed ratio, and the seventh forward speed ratio, are determined utilizing the ring gear/sun gear tooth ratios of all three planetary gearsets 1120, 1130, and 1140. The third forward speed ratio has a numerical value of one. The fifth forward speed ratio has a numerical value determined utilizing the ring gear/sun gear tooth ratios of the planetary gearsets 1120 and 1130. The sixth forward speed ratio has a numerical value determined utilizing the ring gear/sun gear tooth ratio of the planetary gearset 1120.

Figures 25, 26:
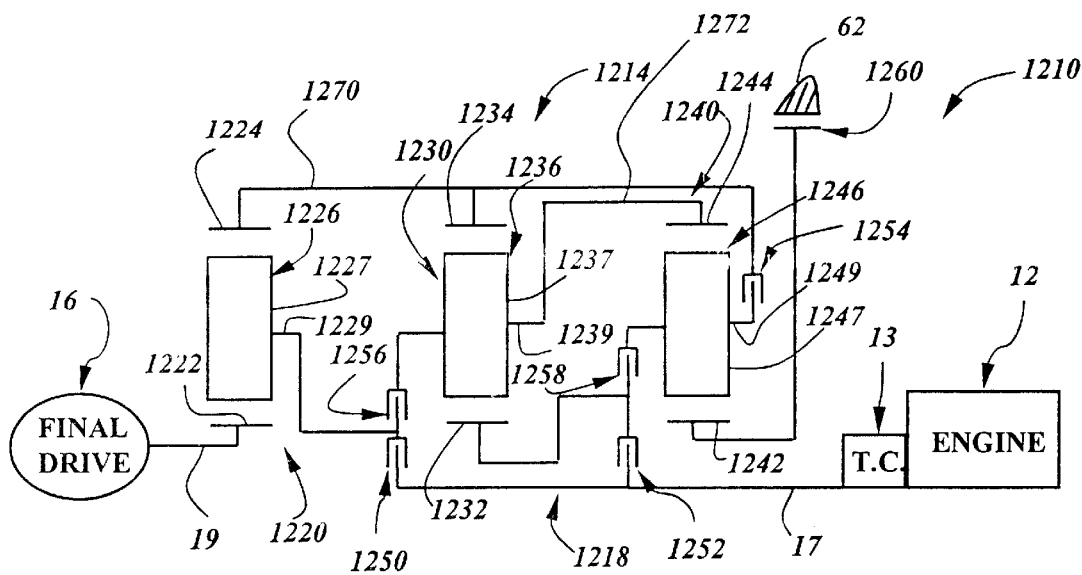
FIG. 25 is a schematic representation of a power transmission incorporating another embodiment of the present invention.
FIG. 26 is a truth table and chart describing the shift sequence and an example of the numerical values available for the embodiment shown in FIG.25.

A powertrain 1210 shown in FIG. 25 includes the engine 12, torque converter 13, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240 and six torque-transmitting mechanisms 1250, 1252, 1254, 1256, 1258, and 1260. The torque-transmitting mechanisms 1250, 1252, 1254, 1256 and 1258 are rotating type torque-transmitting mechanisms, and the torque-transmitting mechanism 1260 is a stationary type torque-transmitting mechanism.

The planetary gearset 1220 includes a sun gear member 1222, a ring gear member 1224, and a planet carrier assembly member 1226. The planet carrier assembly member 1226 includes a plurality of pinion gears 1227 which are rotatably mounted on planet carrier member 1229 and disposed in meshing relationship with both the sun gear member 1222 and the ring gear member 1224.

The planetary gearset 1230 includes a sun gear member 1232, a ring gear member 1234, and a planet carrier assembly member 1236. The planet carrier assembly member 1236 includes a plurality of pinion gears 1237 that are rotatably mounted on a planet carrier member 1239 and disposed in meshing relationship with both the sun gear member 1232 and the ring gear member 1234.

The planetary gearset 1240 includes a sun gear member 1242, a ring gear member 1244, and a planet carrier assembly member 1246. The planet carrier assembly member 1246 includes a plurality of pinion gears 1247 that are rotatably mounted on a planet carrier member 1249 and disposed in meshing relationship with both the sun gear member 1242 and the ring gear member 1244.

The ring gear members 1224 and 1234 are continuously interconnected by an interconnecting member 1270, which is selectively connectible with the planet carrier assembly member 1246 through the torque-transmitting mechanism 1254. The planet carrier assembly member 1236 and ring gear member 1244 are continuously interconnected by an interconnecting member 1272, which is selectively connectible with the planet carrier assembly member 1226 through the torque-transmitting mechanism 1256. The output shaft 19 is continuously connected with the sun gear member 1222.

The input shaft 17 is selectively connectible with the planet carrier assembly member 1226 through the torque-transmitting mechanism 1250 and selectively connectible with the sun gear member 1232 through the torque-transmitting mechanism 1252. The sun gear member 1232 and planet carrier assembly member 1246 are selectively interconnectible through the torque-transmitting mechanism 1258. The sun gear member 1242 is selectively connectible with the transmission housing 62 through the torque-transmitting mechanism 1260.

The truth table of FIG. 26 provides a pictorial representation of the engagement sequence and combinations for the torque-transmitting mechanisms in order to establish a reverse speed ratio and seven forward speed ratios through the planetary gear arrangement 1218 between the input shaft 17 and the output shaft 19. The truth table also provides a representation of the possible numerical values for the speed ratios when the ring gear/sun gear tooth ratios of the planetary gearsets 1220, 1230, and 1240 are equal to those given as R1/S1, R2/S2, and R3/S3, respectively. The chart of FIG. 26 gives the numerical values for the ratio steps between adjacent forward speed ratios as well as between the reverse speed ratio and the first forward speed ratio when the given numerical values for the speed ratios are employed. The chart also depicts the overall ratio spread of the forward speed ratios.

Those skilled in the art will recognize that the combination of engagements for the speed ratios and the given ring gear/sun gear tooth ratios will provide the ratio numbers given in the truth table. Also, those skilled in the art will recognize that the numerical value for the reverse speed ratio, the first forward speed ratio, the second forward speed ratio, the fourth forward speed ratio, and the sixth forward speed ratio are determined utilizing the ring gear/sun gear tooth ratios of all three planetary gearsets 1220, 1230, and 1240. The numerical value for the third forward speed ratio is unity or one. The numerical value for the fifth forward speed ratio is determined utilizing the ring gear/sun gear tooth ratios of the planetary gearsets 1220 and 1240. The numerical value for the seventh forward speed ratio is determined utilizing the ring gear/sun gear tooth ratio of the planetary gearset 1220.

Figures 27, 28:
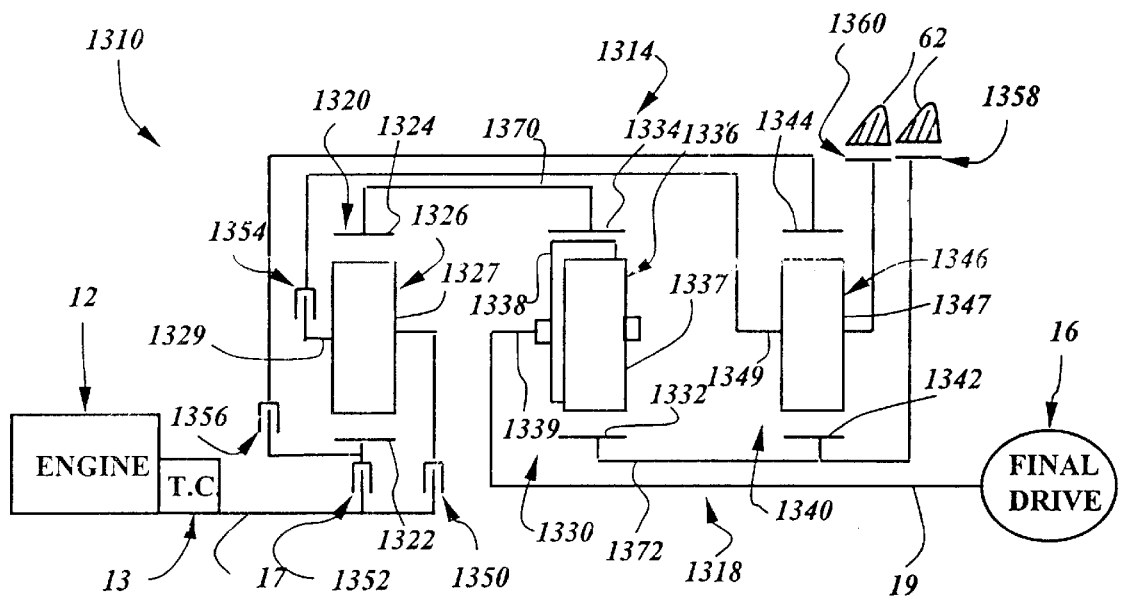
FIG. 27 is a schematic representation of a power transmission incorporating another embodiment of the present invention.
FIG. 28 is a truth table and chart describing the shift sequence and an example of the numerical values available for the embodiment shown in FIG. 27.

A powertrain 1310 shown in FIG. 27 includes the engine 12, torque converter 13, a planetary transmission 1314, and the final drive mechanism 16. The planetary transmission 1314 includes the input shaft 17, a planetary gear arrangement 1318, and the output shaft 19. The planetary gear arrangement 1318 includes three planetary gearsets 1320, 1330, and 1340 and six torque-transmitting mechanisms 1350, 1352, 1354, 1356, 1358, and 1360. The torque-transmitting mechanisms 1350, 1352, 1354, 1356 are rotating type torque-transmitting mechanisms, and the torque-transmitting mechanisms 1358 and 1360 are stationary type torque-transmitting mechanisms.

The planetary gearset 1320 includes a sun gear member 1322, a ring gear member 1324, and a planet carrier assembly member 1326. The planet carrier assembly member 1326 includes a plurality of pinion gears 1327 which are rotatably mounted on planet carrier member 1329 and disposed in meshing relationship with both the sun gear member 1322 and the ring gear member 1324.

The planetary gearset 1330 includes a sun gear member 1332, a ring gear member 1334, and a planet carrier assembly member 1336. The planet carrier assembly member 1336 includes a planet carrier member 1339 on which are rotatably mounted a plurality of pairs of meshing pinion gears 1337 and 1338 which mesh with the sun gear member 1332 and the ring gear member 1334, respectively.

The planetary gearset 1340 includes a sun gear member 1342, a ring gear member 1344, and a planet carrier assembly member 1346. The planet carrier assembly member 1346 includes a plurality of pinion gears 1347 that are rotatably mounted on a planet carrier member 1349 and disposed in meshing relationship with both the sun gear member 1342 and the ring gear member 1344.

The ring gear members 1324 and 1334 are continuously interconnected by an interconnecting member 1370. The sun gear members 1332 and 1342 are continuously interconnected by an interconnecting member 1372, which is selectively connectible with the transmission housing 62 through the torque-transmitting mechanism 1358. The output shaft 19 is continuously connected with the planet carrier member 1339 of the planet carrier assembly member 1336.

The input shaft 17 is selectively connectible with the planet carrier assembly member 1326 through the torque-transmitting mechanism 1350 and selectively connectible with the sun gear member 1322 through the torque-transmitting mechanism 1352. The sun gear member 1322 is selectively connectible with the ring gear member 1344 through the torque-transmitting mechanism 1356. The planet carrier assembly member 1346 is selectively connectible with the planet carrier assembly member 1326 through the torque-transmitting mechanism 1354 and selectively connectible with the transmission housing 62 through the torque-transmitting mechanism 1360.

The truth table shown in FIG. 28 provides a pictorial representation of the engagement sequence and combinations for the torque-transmitting mechanisms in order to establish a reverse speed ratio and seven forward speed ratios in the planetary gear arrangement 1318 between the input shaft 17 and the output shaft 19. The truth table also provides an example of numerical values for the seven forward speed ratios and the reverse speed ratio. These ratio values are determined utilizing the ring gear/sun gear tooth ratios of the planetary gearsets 1320, 1330, and 1340, which are given as R1/S1, R2/S2, and R3/S3, respectively. FIG. 28 also provides a chart depicting the numerical values for the ratio steps between adjacent forward speed ratios as well as between the reverse speed ratio and the first forward speed ratio when the numerical values given in the truth table are employed. The chart also has the numerical value for the overall ratio spread of the forward speed ratios.

Those skilled in the art will recognize that by utilizing the engagement combinations and the given ring gear/sun gear tooth ratios that these numerical values can be readily attained. Also, those skilled in the art will recognize that the reverse speed ratio and the sixth forward speed ratio have numerical values determined utilizing the ring gear/sun gear tooth ratios of the planetary gearsets 1320 and 1330. The first forward speed ratio, the second forward speed ratio, and fourth forward speed ratio have numerical values determined utilizing the ring gear/sun gear tooth ratios of all three planetary gearsets 1320, 1330, and 1340. The numerical value of the third forward speed ratio is one. The numerical value of the fifth forward speed ratio is determined utilizing the ring gear/sun gear tooth ratio of the planetary gearset 1330. The numerical value of the seventh forward speed ratio is determined utilizing the ring gear/sun gear tooth ratios of the planetary gearsets 1330 and 1340.

Figures 29, 30:
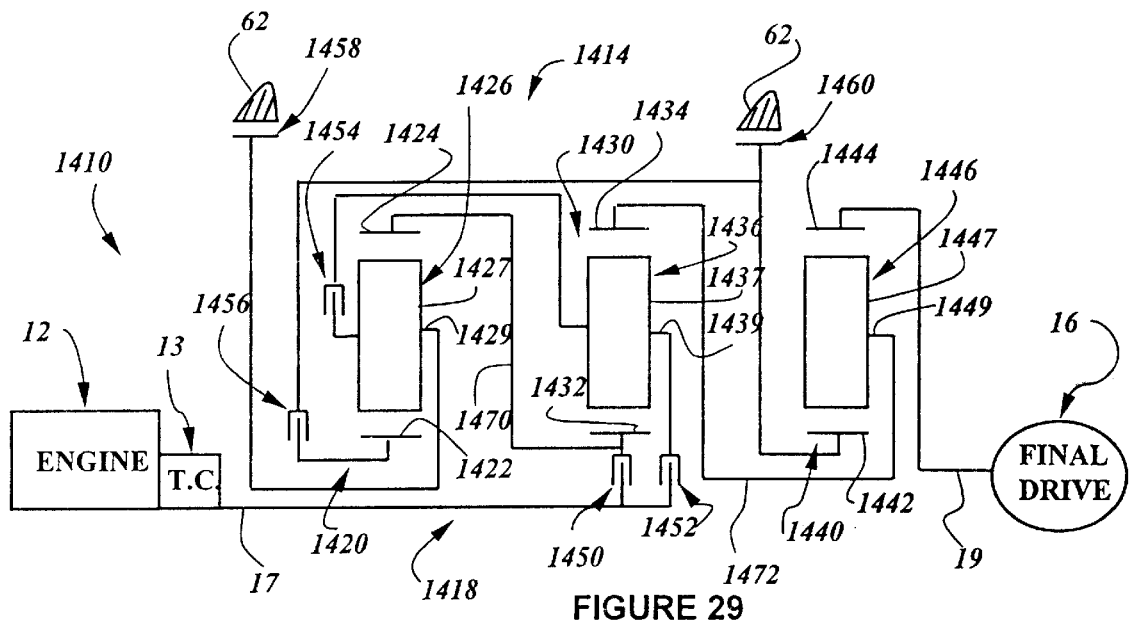
FIG. 29 is a schematic representation of a power transmission incorporating another embodiment of the present invention.
FIG. 30 is a truth table and chart describing the shift sequence and an example of the numerical values available for the embodiment shown in FIG.29.

A powertrain 1410 shown in FIG. 29 includes the engine 12, torque converter 13, a planetary transmission 1414, and the final drive mechanism 16. The planetary transmission 1414 includes the input shaft 17, a planetary gear arrangement 1418, and the output shaft 19. The planetary gear arrangement 1418 includes three planetary gearsets 1420, 1430, and 1440 and six torque-transmitting mechanisms 1450, 1452, 1454, 1456, 1458, and 1460. The torque-transmitting mechanisms 1450, 1452, 1454, and 1456 are rotating type torque-transmitting mechanisms, and the torque-transmitting mechanisms 1458 and 1460 are stationary type torque-transmitting mechanisms.

The planetary gearset 1420 includes a sun gear member 1422, a ring gear member 1424, and a planet carrier assembly member 1426. The planet carrier assembly member 1426 includes a plurality of pinion gears 1427 which are rotatably mounted on planet carrier member 1429 and disposed in meshing relationship with both the sun gear member 1422 and the ring gear member 1424.

The planetary gearset 1430 includes a sun gear member 1432, a ring gear member 1434, and a planet carrier assembly member 1436. The planet carrier assembly member 1436 includes a plurality of pinion gears 1437 that are rotatably mounted on a planet carrier member 1439 and disposed in meshing relationship with both the sun gear member 1432 and the ring gear member 1434.

The planetary gearset 1440 includes a sun gear member 1442, a ring gear member 1444, and a planet carrier assembly member 1446. The planet carrier assembly member 1446 includes a plurality of pinion gears 1447 that are rotatably mounted on a planet carrier member 1449 and disposed in meshing relationship with both the sun gear member 1442 and the ring gear member 1444.

The ring gear member 1424 and sun gear member 1432 are continuously interconnected by an interconnecting member 1470, which is selectively connectible with the input shaft 17 through the torque-transmitting mechanism 1450. The ring gear member 1434 and planet carrier assembly member 1446 are continuously interconnected by an interconnecting member 1472.

The input shaft 17 is selectively connectible with the planet carrier assembly member 1436 through the torque-transmitting mechanism 1452. The sun gear member 1442 is selectively connectible with the sun gear member 1422 through the torque-transmitting mechanism 1456 and selectively connectible with the transmission housing 62 through the torque-transmitting mechanism 1460. The planet carrier assembly member 1426 is selectively connectible with the planet carrier assembly member 1436 through the torque-transmitting mechanism 1454 and selectively connectible with the transmission housing 62 through the torque-transmitting mechanism 1458. The output shaft 19 is continuously connected with the ring gear member 1444.

The truth table of FIG. 30 provides a pictorial representation of the engagement sequence and combinations for the torque-transmitting mechanisms in order to establish a reverse speed ratio and seven forward speed ratios in the planetary gear arrangement 1418 between the input shaft 17 and the output shaft 19. The truth table of FIG. 30 also provides numerical values for these speed ratios. The example numerical values given in the truth table are determined utilizing the ring gear/sun gear tooth ratios of the planetary gearsets 1420, 1430, and 1440 when these ring gear/sun gear tooth ratios are given as R1/S1, R2/S2, and R3/S3, respectively. A chart in FIG. 30 provides a numerical representation of the ratio steps between adjacent forward speed ratios as well as between the reverse speed ratio and the first forward speed ratio when the example speed ratio values are employed. The chart of FIG. 30 also provides the numerical value of the overall ratio spread for the forward speed ratios.

Those skilled in the art, upon reviewing the engagement combinations and sequence, will be able to determine the numerical values given in the truth table. The numerical values for the reverse speed ratio and the sixth forward speed ratio are determined utilizing the ring gear/sun gear tooth ratios of the planetary gearsets 1430 and 1440. The numerical values for the first forward speed ratio, the second forward speed ratio, and the fourth forward speed ratio are determined utilizing the ring gear/sun gear tooth ratios of all three planetary gearsets 1420, 1430, and 1440. The numerical value for the third forward speed ratio is one. The numerical value for the fifth forward speed ratio is determined utilizing the ring gear/sun gear tooth ratio of the planetary gearset 1440. The numerical value for the seventh forward speed ratio is determined utilizing the ring gear/sun gear tooth ratios of the planetary gearsets 1420 and 1440.

Figures 31, 32:
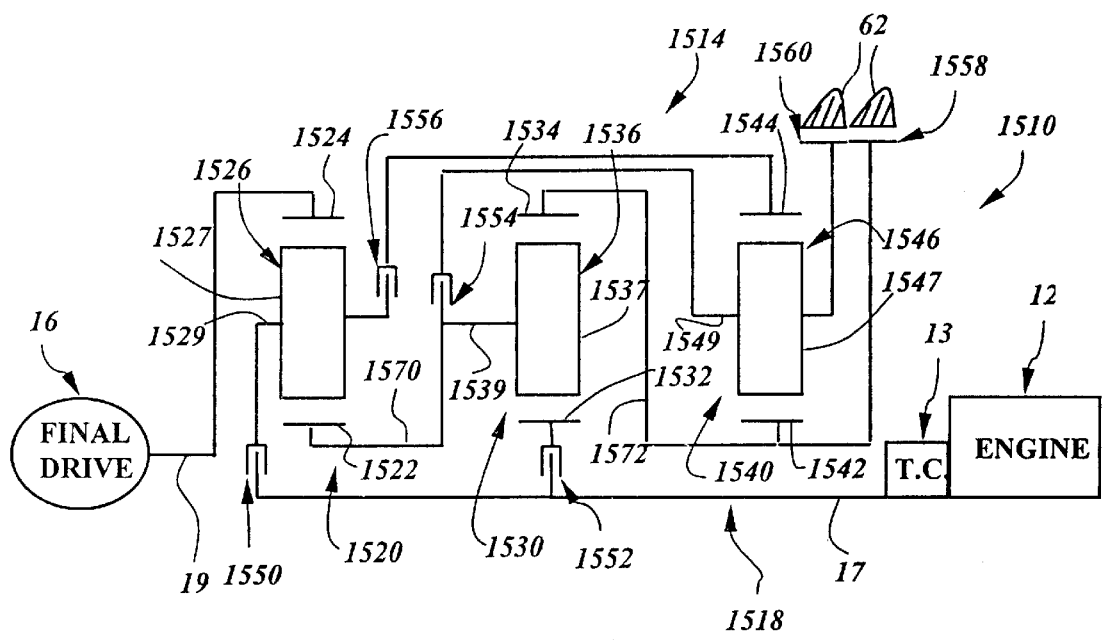
FIG. 31 is a schematic representation of a power transmission incorporating another embodiment of the present invention.
FIG. 32 is a truth table and chart describing the shift sequence and an example of the numerical values available for the embodiment shown in FIG. 31.

A powertrain 1510 shown in FIG. 31 includes the engine 12, torque converter 13, a planetary transmission 1514, and the final drive mechanism 16. The planetary transmission 1514 includes the input shaft 17, a planetary gear arrangement 1518, and the output shaft 19. The planetary gear arrangement 1518 includes three planetary gearsets 1520, 1530, and 1540 and six torque-transmitting mechanisms 1550, 1552, 1554, 1556, 1558, and 1560. The torque-transmitting mechanisms 1550, 1552, 1554, and 1556 are rotating type torque-transmitting mechanisms, and the torque-transmitting mechanisms 1558 and 1560 are stationary type torque-transmitting mechanisms.

The planetary gearset 1520 includes a sun gear member 1522, a ring gear member 1524, and a planet carrier assembly member 1526. The planet carrier assembly member 1526 includes a plurality of pinion gears 1527 which are rotatably mounted on planet carrier member 1529 and disposed in meshing relationship with both the sun gear member 1522 and the ring gear member 1524.

The planetary gearset 1530 includes a sun gear member 1532, a ring gear member 1534, and a planet carrier assembly member 1536. The planet carrier assembly member 1536 includes a plurality of pinion gears 1537 that are rotatably mounted on a planet carrier member 1539 and disposed in meshing relationship with both the sun gear member 1532 and the ring gear member 1534.

planetary gearset 1540 includes a sun gear member 1542, a ring gear member 1544, and a planet carrier assembly member 1546. The planet carrier assembly member 1546 includes a plurality of pinion gears 1547 that are rotatably mounted on a planet carrier member 1549 and disposed in meshing relationship with both the sun gear member 1542 and the ring gear member 1544.

The sun gear member 1522 and planet carrier assembly member 1536 are continuously interconnected by an interconnecting member 1570, which is selectively connectible with the planet carrier assembly member 1546 through the torque-transmitting mechanism 1554. The ring gear member 1534 and sun gear member 1542 are continuously interconnected by an interconnecting member 1572, which is selectively connectible with the transmission housing 62 through the torque-transmitting mechanism 1558. The output shaft 19 is continuously connected with the ring gear member 1524.

The input shaft 17 is selectively connectible with the planet carrier assembly member 1526 through the torque-transmitting mechanism 1550 and selectively connectible with the sun gear member 1532 through the torque-transmitting mechanism 1552. The planet carrier assembly member 1526 is selectively connectible with the ring gear member 1544 through the torque-transmitting mechanism 1556. The planet carrier assembly member 1546 is selectively connectible with the transmission housing 62 through the torque-transmitting mechanism 1560.

The truth table of FIG. 32 is a representation of the sequence and combinations of engagements for the torque-transmitting mechanisms in order to establish a reverse speed ratio and seven forward speed ratios in the planetary gear arrangement 1518 between the input shaft 17 and the output shaft 19. The truth table also provides an example of numerical values that are available with the planetary gear arrangement 1518 when the ring gear/sun gear tooth ratios of the planetary gearsets 1520, 1530, and 1540 are established as given in the values R1/S1, R2/S2, and R3/S3, respectively. Also, given in FIG. 32 is a chart which shows the numerical values of the ratio steps between the seven forward speed ratios as well as between the reverse speed ratio and the first forward speed ratio. This chart also depicts the overall ratio spread of the forward speed ratios.

Upon reviewing the engagement combinations in the given ring gear/sun gear tooth ratios, those skilled in the art will be able to readily calculate the speed ratios that are given in the truth table. The reverse speed ratio and the fifth forward speed ratio have numerical values that are determined utilizing the ring gear/sun gear tooth ratios of the planetary gearsets 1520 and 1530. The first forward speed ratio, the second forward speed ratio, and seventh forward speed ratio have numerical values determined utilizing the ring gear/sun gear tooth ratios of all three planetary gearsets 1520, 1530, and 1540. The third forward speed ratio has a numerical value of one. The fourth forward speed ratio has a numerical value determined by the ring gear/sun gear tooth ratios of the planetary gearsets 1520 and 1540. The sixth forward speed ratio has a numerical value determined by the ring gear/sun gear tooth ratio of the planetary gearset 1520.

Figures 33, 34:
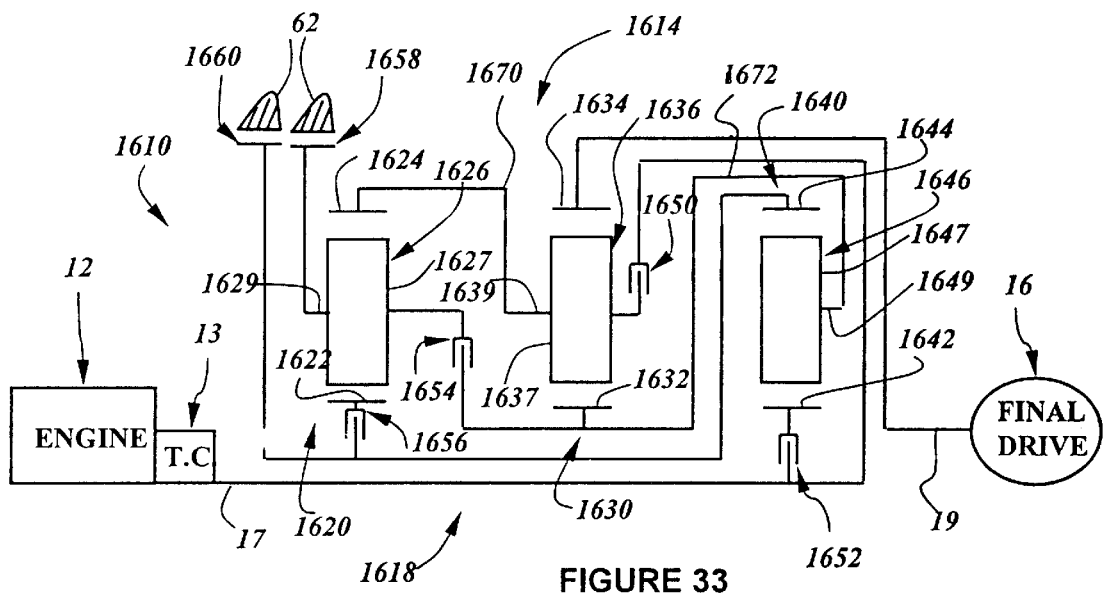
FIG. 33 is a schematic representation of a power transmission incorporating another embodiment of the present invention.
FIG. 34 is a truth table and chart describing the shift sequence and an example of the numerical values available for the embodiment shown in FIG. 33.

A powertrain 1610 shown in FIG. 33 includes the engine 12, torque converter 13, a planetary transmission 1614, and the final drive mechanism 16. The planetary transmission 1614 includes the input shaft 17, a planetary gear arrangement 1618, and the output shaft 19. The planetary gear arrangement 1618 includes three planetary gearsets 1620, 1630, and 1640 and six torque-transmitting mechanisms 1650, 1652, 1654, 1656, 1658, and 1660. The torque-transmitting mechanisms 1650, 1652, 1654, and 1656 are rotating type torque-transmitting mechanisms, and the torque-transmitting mechanisms 1658 and 1660 are stationary type torque-transmitting mechanisms.

The planetary gearset 1620 includes a sun gear member 1622, a ring gear member 1624, and a planet carrier assembly member 1626. The planet carrier assembly member 1626 includes a plurality of pinion gears 1627 which are rotatably mounted on planet carrier member 1629 and disposed in meshing relationship with both the sun gear member 1622 and the ring gear member 1624.

The planetary gearset 1630 includes a sun gear member 1632, a ring gear member 1634, and a planet carrier assembly member 1636. The planet carrier assembly member 1636 includes a plurality of pinion gears 1637 that are rotatably mounted on a planet carrier member 1639 and disposed in meshing relationship with both the sun gear member 1632 and the ring gear member 1634.

The planetary gearset 1640 includes a sun gear member 1642, a ring gear member 1644, and a planet carrier assembly member 1646. The planet carrier assembly member 1646 includes a plurality of pinion gears 1647 that are rotatably mounted on a planet carrier member 1649 and disposed in meshing relationship with both the sun gear member 1642 and the ring gear member 1644.

The ring gear member 1624 and planet carrier assembly member 1636 are continuously interconnected by an interconnecting member 1670 which is selectively connectible with the input shaft 17 through the torque-transmitting mechanism 1650. The sun gear member 1632 and planet carrier assembly member 1646 are continuously interconnected by an interconnecting member 1672 which is selectively connectible with the planet carrier assembly member 1626 through the torque-transmitting mechanism 1654. The output shaft 19 is continuously interconnected with the ring gear member 1634.

The input shaft 17 is selectively connectible with the sun gear member 1642 through the torque-transmitting mechanism 1652. The ring gear member 1644 is selectively connectible with the sun gear member 1622 through the torque-transmitting mechanism 1656 and selectively interconnectible with the transmission housing 62 through the torque-transmitting mechanism 1660. The planet carrier assembly member 1626 is selectively interconnectible with the transmission housing 62 through the torque-transmitting mechanism 1658.

The truth table shown in FIG. 34 provides the engagement sequence and combinations for the torque-transmitting mechanisms in order to establish a reverse speed ratio and seven forward speed ratios between the input shaft 17 and the output shaft 19 through the planetary gear arrangement 1618. The truth table also provides an example of numerical values for these speed ratios. The numerical values given are determined utilizing the ring gear/sun gear tooth ratios of the planetary gearsets 1620, 1630, and 1640. The ring gear/sun gear tooth ratios for these planetary gearsets are given as R1/S1, R2/S2, and R3/S3, respectively. Also given in FIG. 34 is a chart, which provides the numerical values for the ratio steps between adjacent forward speed ratios as well as between the reverse speed ratio and the first forward speed ratio. The overall ratio spread of the forward speed ratios is also given.

Those skilled in the art will recognize that the engagement combinations employed will provide these numerical values when the ring gear/sun gear tooth ratios are those given. The numerical values for the reverse speed ratio and the fifth forward speed ratio are determined utilizing the ring gear/sun gear tooth ratios of the planetary gearsets 1630 and 1640. The first forward speed ratio, the second forward speed ratio, and seventh forward speed ratio have numerical values determined by the ring gear/sun gear tooth ratios of all three planetary gearsets 1620, 1630, and 1640. The third forward speed ratio has a numerical value of one. The fourth forward speed ratio has a numerical value determined by the ring gear/sun gear tooth ratios of the planetary gearsets 1620 and 1630. The sixth forward speed ratio has a numerical value determined by the ring gear/sun gear tooth ratio of the planetary gearset 1630.

Those skilled in the art will recognize that the speed ratio numerical values given for each of the above family members can be changed or reestablished by employing ring gear/sun gear tooth ratios different than those given. These values have been chosen to provide examples that are available for the family members shown above. These ring gear/sun gear tooth ratio numbers and therefore the speed ratio numbers calculated therefrom have been chosen to provide a ratio spread sufficient to permit the employment of a starting device other than a torque converter. With the overall ratio spread given for each of these family members, it is possible to provide sufficient starting or launch torque for a vehicle without the added multiplier of a torque converter. However, the torque converter does provide a smooth launch to which most of the driving public has become accustomed.

Upon reviewing the family members described above, it is now apparent to those skilled in the art that a member of the first planetary gearset; namely, the planetary gearset ending in the numerical designation 20 is continuously interconnected with a member of the planetary gearset ending in the numerical designation 30. Also, another of the members of the planetary gearset ending in the numerical designation 30 is continuously interconnected with a member of the planetary gearset ending in the numerical designation 40. The output shaft 19 is shown throughout the family members to be continuously interconnected with one of the members of one of the planetary gearsets. Also, in each of the family members, the input shaft 17 is selectively connectible with members of one or more of the planetary gearsets through the use of the torque-transmitting mechanisms having numerical designations ending in 50 and 52.

It should also be apparent that modifications and variations are possible to the family that are not depicted in the above-described embodiments. Therefore, the invention is only to be limited by the scope of the appended claims.

What is claimed is:

1. A family of transmissions having a plurality of family members comprising:

an input shaft;

an output shaft;

a transmission housing;

a first planetary gearset having first, second, and third members;

a second planetary gearset having first, second, and third members;

a third planetary gearset having first, second, and third members;

a first interconnecting member continuously interconnecting a first member of the first planetary gearset with a first member of the second planetary gearset;

a second interconnecting member continuously interconnecting a second member of the second planetary gearset with a first member of the third planetary gearset;

said output shaft being continuously interconnected with at least one member of one of the planetary gearsets;

six torque-transmitting mechanisms arranged to provide selective interconnections between said input shaft and said planetary gearsets, between members of said planetary gearsets, between members of said planetary gearsets and said transmission housing; and said six torque-transmitting mechanisms being selectively engageable in combinations of four to establish at least seven forward speed ratios and one reverse speed ratio in said family member.

2. A family of transmissions having a plurality of family members comprising:

an input shaft;

an output shaft;

a transmission housing;

a planetary arrangement including a first planetary gearset, a second planetary gearset, a third planetary gearset, a first interconnecting member, a second interconnecting member, and six torque transmitting mechanisms;

each of said first, second, and third planetary gearsets having first, second, and third members;

said first interconnecting member being continuously interconnected between said first member of said first planetary gearset and said first member of said second planetary gearset, said second interconnecting member being continuously interconnected between said second member of said second planetary gearset and said first member of said third planetary gearset;

said output shaft being continuously interconnected with a member of a first group consisting of said members of said planetary gearsets;

a first of said torque transmitting mechanisms being selectively connectable between said input shaft and a member of said first group;

a second of said torque transmitting mechanisms being selectively connectable between said input shaft and a member of a second group consisting of said members of said planetary gearsets, said first interconnecting member, and said second interconnecting member;

a third of said torque transmitting mechanisms being selectively connectable between a member of said first group and a member of a third group consisting of said output shaft and another member of said first group;

a fourth of said torque transmitting mechanisms being selectively interconnectable between a selected member of a fourth group consisting of said members of said planetary gearsets and a member of a fifth group consisting of said members of said planetary gearsets not selected in said fourth group;

a fifth of said torque transmitting mechanisms being selectively connectable between a selected member of a sixth group consisting of said members of said planetary gearsets and a member of a seventh group consisting of said transmission housing and said members of said first and third planetary gearsets not selected in said sixth group;

a sixth of said torque transmitting mechanisms being selectively connectable between said transmission housing and a member of said first group; and said six torque transmitting mechanism being selectively engaged in combinations of four to establish at least seven forward speed ratios and one reverse speed ratio within said planetary arrangement between said input shaft and said output shaft.

3. The family of transmissions defined in claim 2 further comprising:

each of said first members of said planetary gearsets being a member selected from an eighth group consisting of a sun gear member, a ring gear member, and a planet carrier assembly member, each of said second members of said planetary gearsets being a member of said eighth group not selected as the first member, and each of said third members of said planetary gearsets being the remaining member of said eighth group.

4. The family of transmissions defined in claim 3 further comprising:

each of said planet carrier assembly members including a planet carrier member and a plurality of planet pinion gear members rotatably mounted on said planet carrier member and selected from a group of single pinion members and double pinion member, said single pinion members being disposed in meshing relation with both said sun gear member and said ring gear member when selected and said double pinion members meshing with each other and with respective ones of said ring gear member and said sun gear member.

5. A family of transmission having a plurality of family members wherein each family member comprises:

an input shaft;

an output shaft;

a transmission housing;

a planetary arrangement including a first planetary gearset having a first member, a second member and a third member; a second planetary gearset having a first member, a second member, and a third member; a third planetary gearset having a first member, a second member, and a third member; a first interconnecting member continuously interconnecting said first member of said first planetary gearset and said first member of said second planetary gearset; a second interconnecting member continuously interconnecting said second member of said second planetary gearset and said first member of said third planetary gearset; and six selectively engageable torque transmitting mechanisms;

said output shaft being continuously connected to a member selected from a group consisting of said second member of said first planetary gearset, said second member of said third planetary gearset, and said third member of said second planetary gearset;

a first of said torque transmitting mechanisms being selectively connectable between said input shaft and a member of a group consisting of said second member of said first planetary gearset, said third member of said first planetary gearset, and said first interconnecting member;

a second of said torque transmitting mechanisms being selectively connectable between said input shaft and a member of a group consisting of said third members of said planetary gearsets and said second member of said third planetary gearset;

a third of said torque transmitting mechanisms being selectively connectable between a member of a group consisting of said second member of said first planetary gearset, said third member of said first planetary gearset, and said first interconnecting member and a member of a group consisting of said second interconnecting member, said second member of said third planetary gearset, said third member of said third planetary gearset, and said third member of said second planetary gearset;

a fourth of said torque transmitting mechanisms being selectively connectable between a member of a group consisting of said third members of said first and second planetary gearsets and said second members of said first and third planetary gearsets and a member of a group consisting of second and third members of said third planetary gearset, said first interconnecting member, and said second interconnecting member;

a fifth of said torque transmitting mechanisms being selectively connectable between a member of a group consisting of said transmission housing and said third member of said second planetary gearset and a member of a group consisting of the second and third members of said first planetary gearsets, said second member of said third planetary gearset, said second interconnecting member, and said output shaft;

a sixth of said torque transmitting mechanisms being selectively connectable between said transmission housing and a member of a group consisting of said third members of one of said planetary gearsets; and said six torque transmitting mechanisms being engaged in combinations of four to establish at least seven forward speed ratios and one reverse speed ratio in said planetary arrangement between said input shaft and said output shaft.

* * * * *